United States Patent
Seo

(10) Patent No.: US 7,496,288 B2
(45) Date of Patent: *Feb. 24, 2009

(54) STAGE DRIVING APPARATUS AND ANTI-SHAKE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 389 days.

This patent is subject to a terminal disclaimer.

(21) Appl. No.: 11/229,648

(22) Filed: Sep. 20, 2005

(65) Prior Publication Data

US 2006/0064884 A1    Mar. 30, 2006

(30) Foreign Application Priority Data

Sep. 24, 2004    (JP) .......................... P2004-277731

(51) Int. Cl.
*G03B 17/00* (2006.01)
*H04N 5/228* (2006.01)
(52) U.S. Cl. .................................. 396/55; 348/208.99
(58) Field of Classification Search .................. 396/55, 396/421; 348/208.99, 208.1, 208.2, 208.4, 348/208.5, 208.7, 208.11
See application file for complete search history.

(56) References Cited

U.S. PATENT DOCUMENTS

| 6,035,131 A | 3/2000 | Washisu | |
|---|---|---|---|
| 2006/0067660 A1* | 3/2006 | Seo | 396/55 |

FOREIGN PATENT DOCUMENTS

JP    63-99680    4/1988

OTHER PUBLICATIONS

U.S. Appl. No. 11/115,315 to Seo et al., filed Apr. 27, 2005.
U.S. Appl. No. 11/140,731 to Seo, filed Jun. 1, 2005.
U.S. Appl. No. 11/140,966 to Seo, filed Jun. 1, 2005.
U.S. Appl. No. 11/229,673 to Seo, filed Sep. 20, 2005.

* cited by examiner

*Primary Examiner*—Rodney E Fuller
(74) *Attorney, Agent, or Firm*—Greenblum & Bernstein, P.L.C.

(57) ABSTRACT

A stage driving apparatus linearly and rotationally moves a stage on a plane. A movable unit movable in first and second directions is rotatable on a movable-plane, and is parallel to the first and second directions. A fixed unit supports the movable unit as the movable unit is moved in the first and second directions and is rotated on the movable-plane. A first driving unit supplies a driving force in the second direction, a second driving unit supplies a second driving force in the first direction, and a third driving unit supplies a third driving force in the first direction.

20 Claims, 12 Drawing Sheets

US 7,496,288 B2

STAGE DRIVING APPARATUS AND ANTI-SHAKE APPARATUS

BACKGROUND OF THE INVENTION

1. Field of the Invention

The present invention relates to a stage driving apparatus which can drive a stage linearly and rotationally on a plane while reducing the size of the driving parts.

2. Description of the Related Art

In recent years, an anti-shake apparatus for a photographing apparatus has been proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 63-099680 discloses an anti-shake apparatus for a photographing apparatus. The anti-shake apparatus performs linear movement and rotating operations of a movable unit. The linear movement operation is for correcting the linear movement component of the hand-shake of the photographing apparatus. The rotating operation is for correcting the rotational movement component of the hand-shake of the photographing apparatus.

However, the moving apparatus for the linear movement and the moving apparatus of the rotational movement are separated, so that the anti-shake apparatus is enlarged.

SUMMARY OF THE INVENTION

Therefore, an object of the present invention is to provide a stage driving apparatus that linearly and rotationally moves a stage on a plane while reducing the size of the driving part.

According to the present invention, a stage driving apparatus comprising a movable unit, a fixed unit, first, second, and third driving units, and a controller is provided. The movable unit can be moved in a first direction and in a second direction. The second direction is different from the first direction. The movable unit can be rotated on a movable-plane. The movable plane is parallel to both the first and second directions. The fixed unit supports the movable unit as the movable unit is moved in the first and second directions and rotated on the movable-plane. The first driving unit supplies a first driving force in the second direction to the movable unit. The second driving unit supplies a second driving force in the first direction to the movable unit. The third driving unit supplies a third driving force in the first direction to the movable unit. The controller controls the first, the second, and the third driving forces. The first, the second, and the third driving units are attached to one of the movable unit and the fixed unit. A point, on the movable unit, that receives the second driving force from the second driving unit is defined as a second driving point. Another point, on the movable unit, that receives the third driving force from the third driving unit is defined as a third driving point. A line segment connecting the second and the third driving points is not parallel to the first direction.

Further, the first driving unit comprises a first coil and a first driving-magnet. The first coil and the first driving-magnet are used for generating a first electromagnetic force in order to supply the movable unit with the first driving force. The second driving unit comprises a second coil and a second driving-magnet. The second coil and the second driving-magnet are used for generating a second electromagnetic force in order to supply the movable unit with the second driving force. The third driving unit comprises a third coil and a third driving-magnet. The third coil and the third driving-magnet are used for generating a third electromagnetic force in order to supply the movable unit with the third driving force.

Further, the first, the second, and the third coils are arranged so that the first, the second, and the third coils respectively face the first, the second, and the third driving-magnets in a third direction perpendicular to the movable-plane.

Further, a coil pattern of the first coil has a line segment perpendicular to the second direction. A coil pattern of the second coil has a line segment perpendicular to the first direction. A coil pattern of the third coil has a line segment perpendicular to the first direction. An N pole and an S pole of the first driving-magnet are arranged in the second direction. An N pole and an S pole of the second driving-magnet are arranged in the first direction. An N pole and an S pole of the third driving-magnet are arranged in the first direction.

Further, the controller controls the second and the third electromagnetic forces so that the direction and the sizes of the second and the third electromagnetic forces are the same when the movable unit is moved in the first direction. The controller controls the second and the third electromagnetic forces so that the directions of the second and the third electromagnetic forces are opposite each other and so that the sizes of the second and the third electromagnetic forces are the same when the movable unit is rotated on the movable-plane without moving in the first direction. The controller controls the second and the third electromagnetic forces so that the sizes of the second and the third electromagnetic forces are different when the movable unit is moved in the first direction and rotated on the movable-plane.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
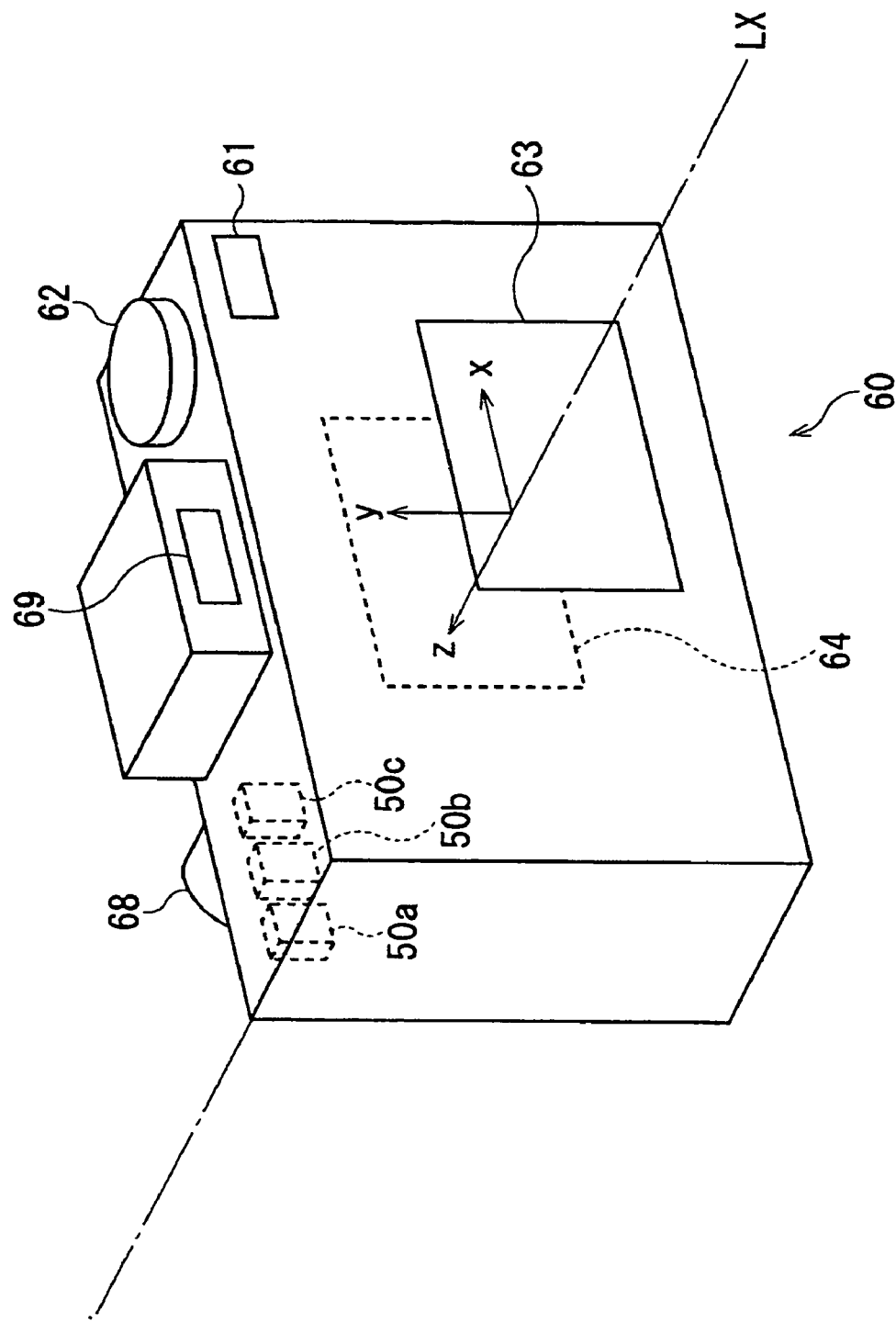
FIG. 1 is a diagram of the appearance showing the camera having on anti-shaking function utilizing the stage driving apparatus in the first, the second, and the third embodiments.

The present invention is described below with reference to the embodiments shown in the drawings.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 5.

Figure 3:
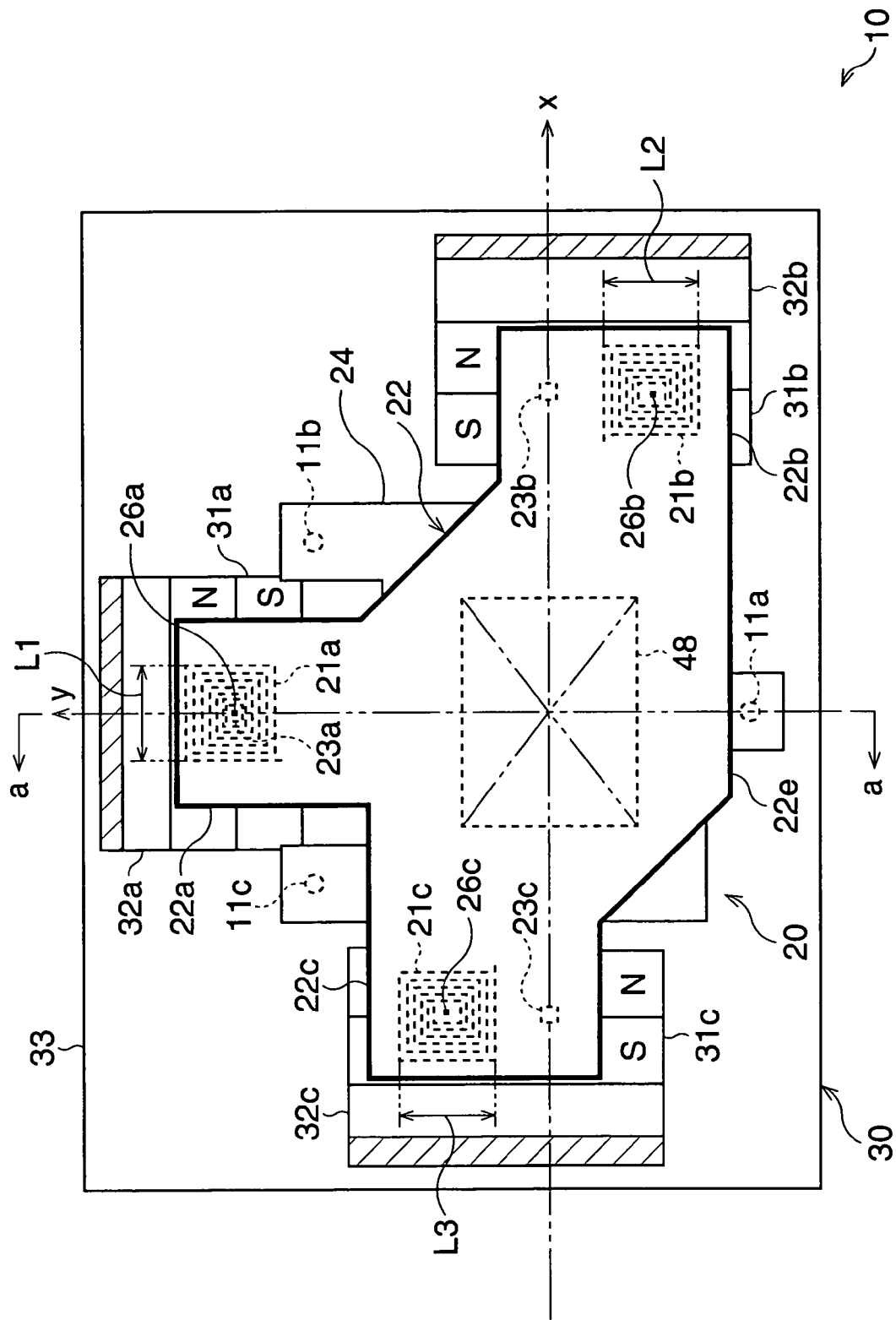
FIG. 3 is a front view of the stage driving apparatus in the first embodiment.
Figure 4:
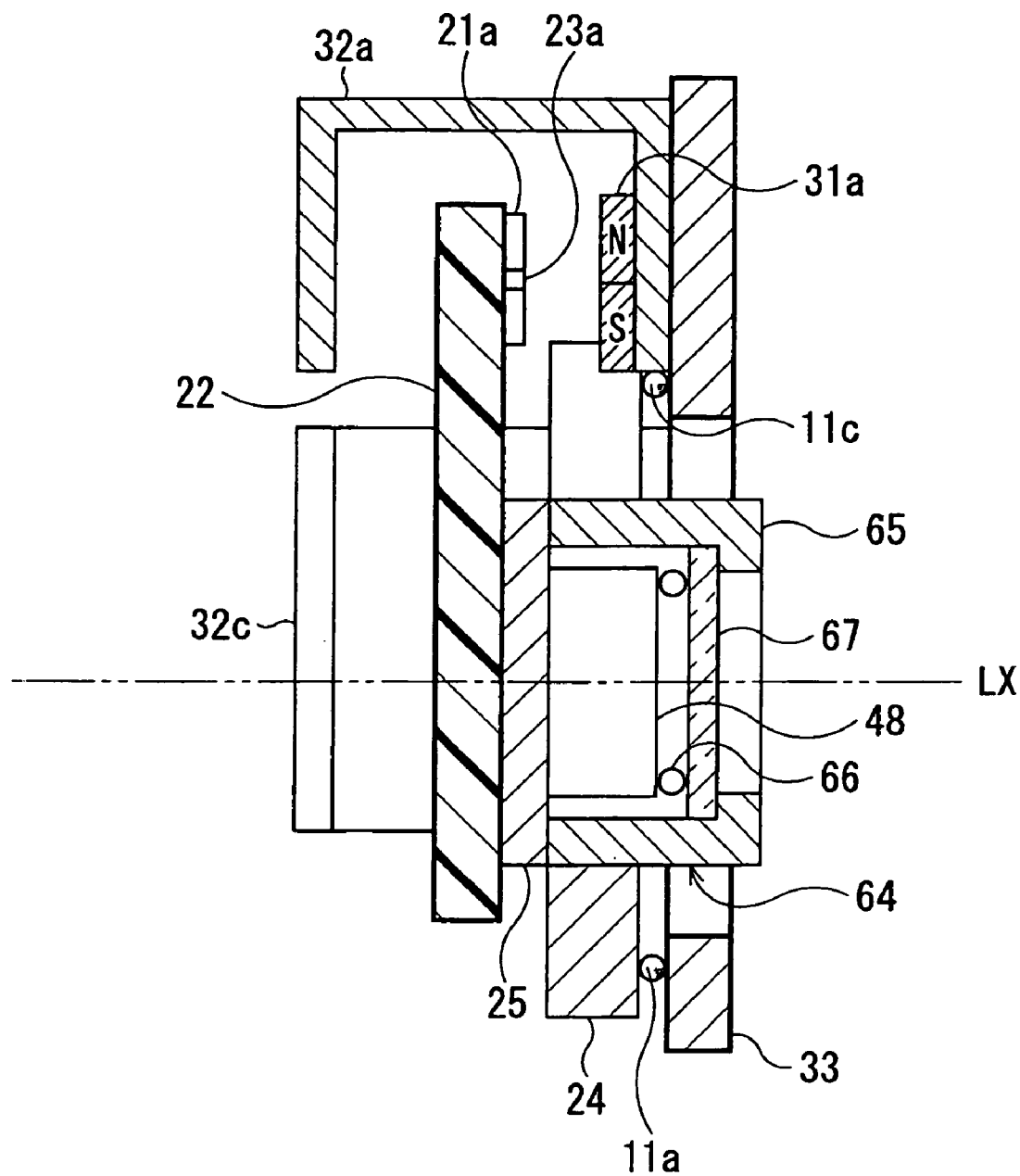
FIG. 4 illustrates a construction diagram of the section along line a-a of FIG. 3.

FIG. 4 shows a construction diagram of the section along line a-a of FIG. 3.

Figure 2:
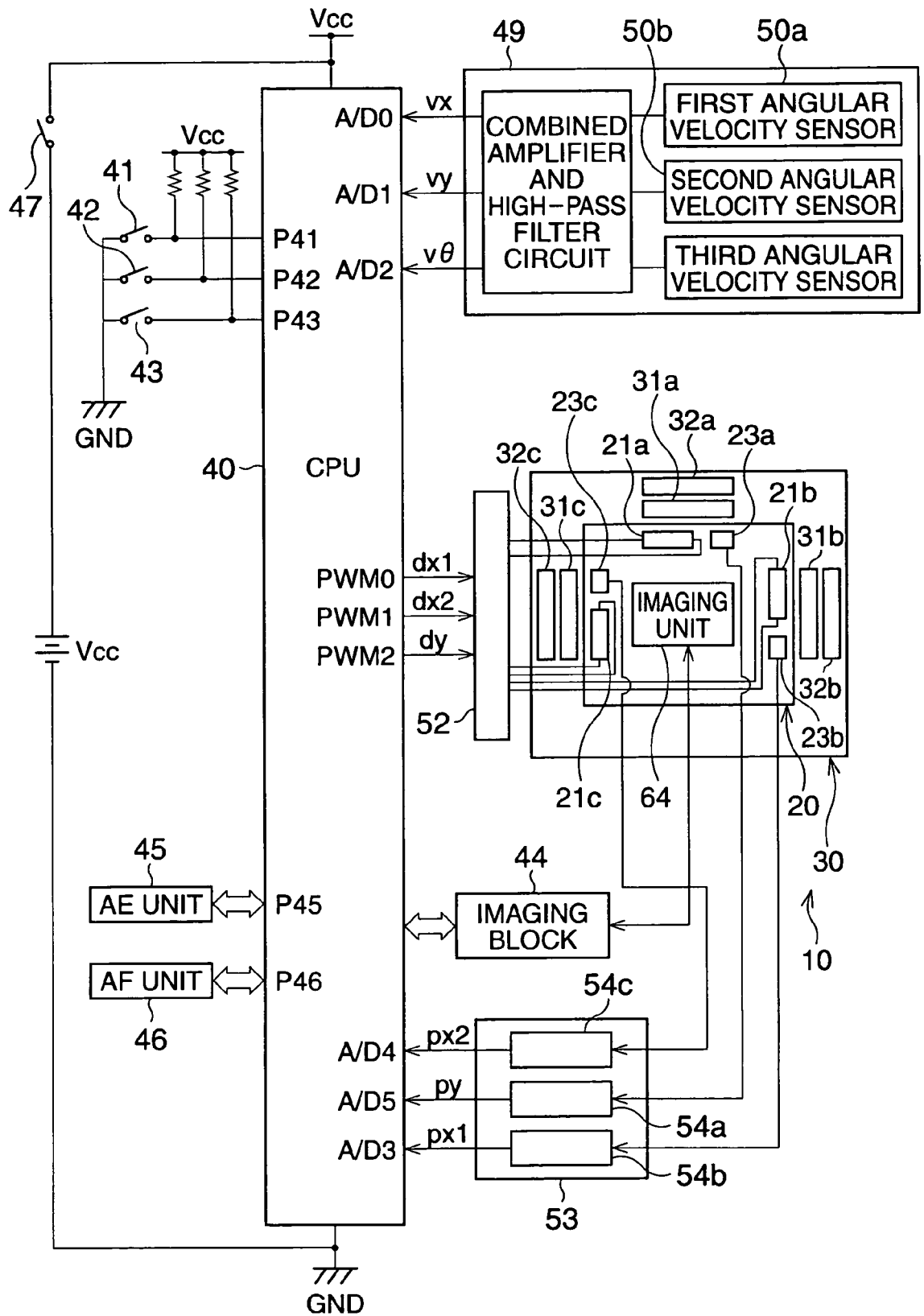
FIG. 2 is a circuit diagram showing the electrical structure of the camera in the first embodiment.

A camera 60 comprises a power-on button 61, a release button 62, an LCD monitor 63, a CPU 40, an imaging block 44, an AE (automatic exposure) unit 45, an AF (automatic focus) unit 46, an imaging unit 64, and a camera lens 68 (see FIGS. 1 and 2).

By pushing the power-on button 61, a state of a power-switch 47 is changed from an on state to an off state or from an off state to an on state.

The imaging unit 64 comprises an imaging device 48 (see FIG. 4). The imaging device 48 is, for example a CCD, CMOS, or such like. The light from the photographic subject is received by an imaging device 48 through the camera lens 68. The photographic subject image is displayed on the LCD monitor 63.

When the release button 62 is half pushed by the operator, the photometric switch 41 changes to the on state, so that the photometric operation, the AF sensing operation, and the focusing operation are performed.

When the release button 62 is fully pushed by the operator, the release switch 42 changes to the on state, so that the imaging operation is performed.

The CPU 40 controls each component of the camera 60, regarding some operations of the camera 60 including the anti-shake operation, that is explained later.

The imaging block 44 drives the imaging unit 64. The AE unit 45 performs the photometric operation for the photographic subject and then calculates the exposure value. Corresponding to the exposure value, the AE unit 45 calculates the aperture value and the time length of the exposure time, that are needed for imaging. The AF unit 46 performs the AF sensing operation. Corresponding to the result of the AF sensing operation, the AF unit 46 performs the focusing operation, that is needed for the imaging. In the focusing operation, the position of the camera lens 68 is moved in the optical axis LX direction.

The anti-shaking part of the camera 60 comprises an anti-shaking button 69, the CPU 40, an angular velocity detecting unit 49, a driver circuit 52, a stage driving apparatus 10, a hall-element signal-processing unit 53, and the camera lens 68 (see FIGS. 1 and 2).

When the anti-shake button 69 is pushed by the operator, the anti-shake switch 43 changes to the on state. Under the on state of the anti-shake switch 43, the anti-shake operation is performed by driving the angular velocity detecting unit 49 and the stage driving apparatus 10 at every predetermined time interval. The anti-shaking operation is performed independently of the other operations including the above mentioned photometric operation etc.

The various output commands corresponding to the input signals of the switches 41~43 are controlled by the CPU 40.

The information regarding whether the photometric switch 41 is in the on or off state, is input to port P41 of the CPU 40 as 1-bit digital signal.

The information regarding whether the release switch 42 is in the on or off state, is input to port P42 of the CPU 40 as 1-bit digital signal.

The information regarding whether the anti-shake switch 43 is in the on or off state, is input to port P43 of the CPU 40 as 1-bit digital signal.

Next, the details of the input and output relationship with the CPU 40 for the angular velocity unit 49, the driver circuit 52, the stage driving apparatus 10, and the hall-element signal-processing unit 53, are explained.

The angular velocity unit 49 comprises a first angular velocity sensor 50a, a second velocity sensor 50b, a third velocity sensor 50c, and a combined amplifier and high-pass filter circuit 51. The first angular velocity sensor 50a detects the velocity-component in the first direction x of the angular velocity of the camera 60, at every predetermined time interval (1 ms). The second angular velocity sensor 50b detects the velocity-component in the second direction y of the angular velocity of the camera 60, at every predetermined time interval (1 ms). The third angular velocity sensor 50c detects the rotation-velocity-component of the angular velocity on a plane perpendicular to the third direction z, hereinafter referred to as an xy plane, at every predetermined time interval (1 ms).

The combined amplifier and high-pass filter circuit 51 amplifies the signals regarding the first direction x of the angular velocity, that is the velocity-component in the first direction x of the angular velocity. Then the combined amplifier and high-pass filter circuit 51 reduces a null voltage and a panning of the first angular velocity sensor 50a from the amplified signal regarding the first direction x of the angular velocity. After that, the combined amplifier and high-pass filter circuit 51 outputs the analogue signal to the A/D converter A/D 0 of the CPU 40 as a first angular velocity vx.

The combined amplifier and high-pass filter circuit 51 amplifies the signals regarding the second direction y of the angular velocity, that is the velocity-component in the second direction y of the angular velocity. Then the combined amplifier and high-pass filter circuit 51 reduces a null voltage and a panning of the second angular velocity sensor 50b, from the amplified signal regarding the second direction y of the angular velocity. After that, the combined amplifier and high-pass filter circuit 51 outputs the analogue signal to the A/D converter A/D 1 of the CPU 40 as a second angular velocity vy.

The combined amplifier and high-pass filter circuit 51 amplifies the signals regarding the rotation-speed of the angular velocity, that is the rotation-velocity-component on the xy plane of the angular velocity. Then the combined amplifier and high-pass filter circuit 51 reduces a null voltage and a panning of the third angular velocity sensor 50c from the amplified signal regarding the rotation-speed of the angular velocity. After that, the combined amplifier and high-pass filter circuit 51 outputs the analogue signal to the A/D converter A/D 2 of the CPU 40 as a third angular velocity vθ.

The CPU 40 converts the first, the second, and the third angular velocity vx, vy, vθ, that are input respectively to the A/D converters A/D 0, A/D 1, A/D 2, to digital signals. Then the CPU 40 calculates the hand-shake quantity that occurs in the predetermined time (1 ms), based on the converted digital signals and the converting coefficient, where a focal distance is considered. This hand-shake quantity includes a component in the first direction x, a component in the second direction y, and a rotation component on the xy plane.

The CPU 40 calculates the position S of the imaging unit 64, that should be moved to and rotated to, corresponding to the hand-shake quantity calculated, for the first direction x, the second direction y, and the rotation angle.

The location in the first direction x of the position S is defined as sx. The location in the second direction y of the position S is defined as sy. The rotation angle on the xy plane of the position S is defined as sθ.

The movement of the movable unit 20 including the imaging unit 64 is performed by using electromagnetic force and is described later. The driving force D for moving and rotating the movable unit 20 to the position S has a first horizontal PWM duty dx1 as one of the driving-force components in the first direction x, a second horizontal PWM duty dx2 as another driving-force component in the first direction x, and a vertical PWM duty dy as the driving-force component in the second direction y. The first and the second horizontal PWM duties dx1, and dx2, from the PWM 0 and the PWM 1, of the CPU 40, and the vertical PWM duty dy from the PWM 2 of the CPU 40 are input to the driving circuit 52.

The stage driving apparatus 10 comprises the movable unit 20 and a fixed unit 30 (see FIGS. 2 and 3). The movable unit 20 has the imaging unit 64. The stage driving apparatus 10 makes the imaging unit 64 move and rotate to the position S. Owing to the movement and the rotation to the position S, a movement of the photographic image on the imaging surface of the imaging device 48 during imaging is cancelled. Then, the photographing subject image that reaches the imaging surface of the imaging device 48 is stabilized. Consequently, the hand-shake effect can be corrected.

The driving of the movable unit 20 is performed by a first, a second, and a third driving unit (not depicted) The first, the second, and the third driving units are controlled by the driving circuit 52 based on the first and the second horizontal PWM duties dx1, dx2, and the vertical PWM duty dy.

The detected-position P of the movable unit 20, that is moved and rotated by the first, the second, and the third driving units, is detected by a first, a second, and a third hall element 23a, 23b, 23c and the hall-element signal-processing unit 53 (position-detecting operation).

A first and a second horizontal detected-position signals px1, px2, that correspond to position components of the first direction x, are input respectively to the A/D converter A/D3, A/D4 of the CPU 40. A vertical detected-position signal py, that corresponds to a position component of the second direction y, is input to the A/D converter A/D5 of CPU40. The first and the second horizontal detected-position signals px1, px2, that are analogue signals, are converted to digital signals respectively through the A/D converters A/D3, A/D4 (A/D converting operation). The vertical detected-position signal py, that is an analogue signal, is converted to a digital signal through the A/D converter A/D5 (A/D converting operation).

A first data in the first direction x for the detected-position P, after the A/D converting operation, is defined as pdx1, corresponding to the first horizontal detected-position signal px1. A second data in the first direction x for the detected-position P, after the A/D converting operation, is defined as pdx2, corresponding to the second horizontal detected-position signal px2. A data in the second direction y for the detected-position P, after the A/D converting operation, is defined as pdy, corresponding to the vertical detected-position signal py.

A first location pxx in the first direction x for the detected-position P is calculated by the CPU 40 based on the data pdx1, pdx2, pdy. A second location pyy in the second direction y for the detected-position P is calculated by the CPU 40 based on the data pdx1, pdx2, pdy. A rotation angle pθ on the xy plane for the detected-position P is calculated by the CPU 40 based on the data pdx1, pdx2, pdy.

Movements of the first, the second, and the third driving units are controlled based on the data for the detected-position P (pxx, pyy, pθ) and the data for the position S (sx, sy, sθ) that should be moved to and rotated to.

The first driving unit comprises a first coil 21a and a first magnet 31a, that are used for movement in the second direction y. The second driving unit comprises a second coil 21b and a second magnet 31b, that are used for movement in the first direction x. The third driving unit comprises a third coil 21c and a third magnet 31c, that are used for movement in the first direction x.

The movable unit 20 comprises a movable circuit board 22, the first, the second, and the third coils 21a, 21b, 21c, the imaging unit 64, the first, the second, and the third hall elements 23a, 23b, 23c, a ball-contact board 24, and a plate 25 (see FIGS. 3 and 4).

The fixed unit 30 comprises the first, the second, and the third magnets 31a, 31b, 31c, a first, a second, and a third yokes 32a, 32b, 32c, and a base board 33 (see FIGS. 3 and 4).

The first, the second, and the third balls 11a, 11b, 11c are held between the movable unit 20 and the fixed unit 30. The first, the second, and the third balls 11a, 11b, 11c are located on a single plane perpendicular to the third direction z. The first, the second, and the third balls 11a, 11b, 11c can roll between the ball-contact board 24 and the base board 33. A contact of the movable unit 20 and the fixed unit 30 is kept through the first, the second, and the third balls 11a, 11b, 11c. Accordingly, the movable unit 20 is supported by the fixed unit 30 as the movable unit 20 can move in the first direction x and the second direction y and rotate along a line parallel to the optical axis LX.

The movable unit 20 is urged to the fixed unit 30 in the third direction z by an urging member, such as a spring etc., fixed in the fixed unit 30 or the camera 60. The movable and rotatable situation of the movable unit 20 on the xy plane is maintained.

The imaging surface of the imaging device 48 is shaped like a rectangle. The imaging surface has two diagonal lines. The intersection point of these two diagonal lines is defined as the center of the imaging device 48.

When the center of the imaging device 48 is located on the optical axis LX of the camera lens 68, the location relation between the movable unit 20 and the fixed unit 30 is set up so that the movable unit 20 is located at the center of its movable range in both the first direction x and the second direction y, in order to utilize the full size of the imaging range of the imaging device 48. Further in the initial situation before the movable unit 20 moves and rotates, the location relation between the movable unit 20 and the fixed unit 20 is set up so that the movable unit 20 is located at the center of the movable range. Further in the initial situation, the location relation between the movable unit 20 and the fixed unit 30 is set up so that the four sides of the imaging surface of the imaging device 48 can be parallel to the first direction x or the second direction y.

The imaging unit 64 and the plate 25 are attached to the movable circuit board 22 of the movable unit 20 in this order along the optical axis LX direction, viewed from the side of the camera lens 68. The imaging unit 64 comprises the imaging device 48, a stage 65, a pressing member 66, and an optical low pass filter 67. The stage 65 and the plate 25 hold the imaging device 48, the pressing member 66, and the optical low pass filter 67 in the optical axis direction. The ball-contact board 24 is attached to the stage 65.

The imaging device 48 is attached to the movable circuit board 22 through the plate 25. The plate 25 is made of a metallic material. The plate 25 has an effect of radiating heat from the imaging device 48, by contacting the imaging device 48. The imaging device is positioned so as that the imaging surface of the imaging device 48 is perpendicular to the optical axis LX of the camera lens 68.

The movable circuit board 22 is shaped almost like the letter T. The movable circuit board 22 comprises a central member 22e, a first, a second, and a third side member 22a, 22b, 22c. The first side member 22a is extended from the central member 22e in the second direction y. The second and the third side members 22b, 22c are extended from the central member 22e in the first direction x. The third side member 22c is shifted from the second side member 22b, viewed from the first direction x.

The imaging unit 64 is attached to the central member 22e. The first coil 21a is attached to the first side member 22a. The second coil 21b is attached to the second side member 22b. The third coil 21c is attached to the third side member 22c. The first, the second, and the third coils 21a, 21b, 21c form a sheet and a spiral shape coil pattern.

The coil pattern of the first coil 21a has a line segment that is parallel to the first direction x before the movable unit 20 is rotated. The line segment that is parallel to the first direction x is used for generating a first electromagnetic force Pw1, of which the direction is the second direction y. The movable unit 20 is moved in the second direction y by the first electromagnetic force Pw1.

The coil pattern of the second coil 21b has a line segment that is parallel to the second direction y before the movable unit 20 is rotated. The line segment that is parallel to the second direction y is used for generating a second electromagnetic force Pw2, of which the direction is the first direction x. The movable unit 20 is moved in the first direction x by the second electromagnetic force Pw2.

The coil pattern of the third coil 21c has a line segment that is parallel to the second direction y, before the movable unit 20 is rotated. The line segment that is parallel to the second direction y is used for generating a third electromagnetic force Pw3, of which the direction is the first direction x. The movable unit 20 is moved in the first direction x by the third electromagnetic force Pw3.

The first electromagnetic force Pw1 along the second direction y occurs based on the current flowing on the line segment, that is parallel to the first direction x, of the first coil 21a and the magnetic field of the first magnet 31a.

The second electromagnetic force Pw2 along the first direction x occurs based on the current flowing on the line segment, that is parallel to the second direction y, of the second coil 21b and the magnetic field of the second magnet 31b.

The third electromagnetic force Pw3 along the first direction x occurs based on the current flowing on the line segment, that is parallel to the second direction y, of the third coil 21c and the magnetic field of the third magnet 31c.

The first electromagnetic force Pw1 is a resultant force, that is comprised of all forces generated at all line segments, parallel to the first direction x, of the first coil 21a. A single point considered to receive the first electromagnetic force Pw1 is defined as a first driving point 26a. The coil pattern of the first coil 21a is formed so that the first driving point 26a is located at the center of the first coil 21a.

The second electromagnetic force Pw2 is a resultant force, that is comprised of all forces generated at all line segments, parallel to the second direction y, of the second coil 21b. A single point considered to receive the second electromagnetic force Pw2 is defined as a second driving point 26b. The coil pattern of the second coil 21b is formed so that the second driving point 26b is located at the center of the second coil 21b.

The third electromagnetic force Pw3 is a resultant force, that is comprised of all forces generated at all line segments, parallel to the second direction y, of the third coil 21c. A single point considered to receive the third electromagnetic force Pw3 is defined as a third driving point 26c. The coil pattern of the third coil 21c is formed so that the third driving point 26c is located at the center of the third coil 21c.

The first coil 21a is attached to the first side member 22a so that a line segment connecting the first driving point 26a and the center of the imaging device 48 is parallel to the second direction y in the initial situation before the movable unit 20 moves and rotates. The second and the third coils 21b, 21c are attached respectively to the second and the third side members 22b, 22c so that the following conditions are satisfied. One condition is that the center of the imaging device 48 agrees with the center of a line segment connecting the second and the third driving points 26b, 26c. Another condition is that the line segment connecting the second and the third driving points 26b, 26c crosses a line parallel to the first direction x in the initial situation before the movable unit 20 moves and rotates. In other words, the line segment connecting the second and the third driving points 26b, 26c is not parallel to the first direction x in the initial situation before the movable unit 20 moves and rotates.

Therefore, the movable unit 20 can be moved on the xy plane and rotated around a line passing through the center of the imaging device 48 and being perpendicular to the xy plane, by controlling a size and a direction of the first, the second, and the third electromagnetic forces Pw1, Pw2, Pw3.

The thickness of the first, the second, and the third coils 21a, 21b, 21c in the third direction z can be small because the coils 21a, 21b, 21c are formed as a sheet. Accordingly, the thickness of the first, the second, and the third coils 21a, 21b, 21c in the third direction z hardly increases even if the first, the second, and the third coils 21a, 21b, 21c are composed of a plurality of sheet coils layered in the third direction z so as to increase the electromagnetic force. Consequently, the stage driving apparatus 10 can be downsized by narrowing the distance between the movable unit 20 and the fixed unit 30.

The first, the second, and the third coils 21a, 21b, 21c are connected with the driver circuit 52 through a flexible circuit board (not depicted). The driver circuit 52 drives the first, the second, and the third coils 21a, 21b, 21c. As described above, the first and the second horizontal PWM duties dx1, dx2 are input to the driver circuit 52 respectively from the PWM 0 and PWM 1 of the CPU 40. The vertical PWM duty is input to the driver circuit 52 from the PWM 2 of the CPU 40.

The driver circuit 52 supplies power to the first coil 21a corresponding to the value of the vertical PWM duty dy. The movable unit 20 is moved in the second direction y by the first electromagnetic force Pw1 generated with power supplied to the first coil 21a. The driver circuit 52 supplies power to the second and the third coils 21b, 21c respectively corresponding to the value of the first and the second horizontal PWM duties dx1, dx2. The movable unit 20 is moved in the first direction x and rotated on the xy plane by the second and the third electromagnetic forces Pw2, Pw3 generated with power supplied to the second and the third coils 21b, 21c.

When the movable unit 20 is moved in the first direction x, the CPU 40 controls the values of the first and the second horizontal PWM duties dx1, dx2 so that the direction and the sizes of the second and the third electromagnetic forces Pw2, Pw3 are the same.

When the movable unit 20 is rotated on the xy plane without moving in the first direction x, the CPU 40 controls the values of the first and the second horizontal PWM duties dx1, dx2 so that the direction of the second and the third electromagnetic forces Pw2, Pw3 is opposite each other and so that the sizes of the second and the third electromagnetic forces Pw2, Pw3 are the same.

When the movable unit 20 is moved in the first direction x and rotated on the xy plane, the CPU 40 controls the first and the second horizontal PWM duties dx1, dx2 so that the sizes of the second and the third electromagnetic forces Pw2, Pw3 are different from each other.

The first hall element 23a is attached to the first side member 22a so that the first hall element 23a agrees with the first driving point 26a. The second hall element 23b is attached to the second side member 22b so that the second hall element 23b is located at a point intersecting a line, that passes through the center of the imaging device 48 and is parallel to the first direction x, and a line, that passes through the second driving point 26b and is parallel to the second direction y. The third hall element 23c is attached to the third side member 22c so that the third hall element 23c is located at a point intersecting a line, that passes through the center of the imaging device 48 and is parallel to the first direction x, and a line, that passes through the third driving point 26c and is parallel to the second direction y.

The first, the second, and the third yokes 32a, 32b, 32c and the first, the second, and the third magnets 31a, 31b, 31c are attached to the base board 33 of the fixed unit 30. The base board 33 is positioned between the movable circuit board 22 and the camera lens 68 as the base board 33 is kept parallel to the imaging surface of the imaging device 48.

The first magnet 31a is attached to the movable unit 20 side of the fixed unit 30 through the first yoke 32a. The first magnet 31a is positioned on the fixed unit 30 so that the first magnet 31a faces the first coil 21a and the first hall element 23a in the third direction z. The second magnet 31b is attached to the movable unit 20 side of the fixed unit 30 through the second yoke 32b. The second magnet 31b is positioned on the fixed unit 30 so that the second magnet 31b faces the second coil 21b and the second hall element 23b in the third direction z. The third magnet 31c is attached to the movable unit 20 side of the fixed unit 30 through the third yoke 32c. The third magnet 31c is positioned on the fixed unit 30 so that the third magnet 31c faces the third coil 21c and the third hall element 23c in the third direction z.

The N pole and the S pole of the first magnet 31a are arranged in the second direction y. The length of the first magnet 31a in the first direction x is longer than the first effective length L1 of the first coil 21a in the first direction x (see FIG. 3). The magnetic-field that influences the first coil 21a and the first hall element 23a, is prevented from changing during the movement of the movable unit 20 in the first direction x due to the above length of the first magnet 31a.

The N pole and the S pole of the second magnet 31b are arranged in the first direction x. The length of the second magnet 31b in the second direction y is longer than the second effective length L2 of the second coil 21b in the second direction y. The magnetic-field that influences the second coil 21b and the second hall element 23b is prevented from changing during the movement of the movable unit 20 in the second direction y due to the above length of the second magnet 31b.

The N pole and the S pole of the third magnet 31c are arranged in the first direction x. The length of the third magnet 31c in the second direction y is longer than the third effective length L3 of the third coil 21c in the second direction y. The magnetic-field that influences the third coil 21c and the third hall element 23c is prevented from changing during the movement of the movable unit 20 in the second direction y due to the above length of the third magnet 31c.

The first yoke 32a is made of a soft magnetic material. The first yoke 32a forms a square-u-shape channel when viewed from the first direction x. The first yoke 32a is fixed on the movable unit 20 side of the base board 33. The first magnet 31a, the first coil 21a, and the first hall element 23a are inside the channel of the first yoke 32a in the third direction z.

The side of the first yoke 32a contacting the first magnet 31a prevents the magnetic-field of the first magnet 31a from leaking to the surrounding. The other side of the first yoke 32a raises the magnetic-flux density between the first magnet 31a and the first coil 21a and between the first magnet 31a and the first hall element 23a.

The second yoke 32b is made of a soft magnetic material. The second yoke 32b forms a square-u-shape channel when viewed from the second direction y. The second yoke 32b is fixed on the movable unit 20 side of the base board 33. The second magnet 31b, the second coil 21b, and the second hall element 23b are inside the channel of the second yoke 32b in the third direction z.

The side of the second yoke 32b contacting the second magnet 31b prevents the magnetic-field of the second magnet 31b from leaking to the surroundings. The other side of the second yoke 32b raises the magnetic-flux density between the second magnet 31b and the second coil 21b and between the second magnet 31b and the second hall element 23b.

The third yoke 32c is made of a soft magnetic material. The third yoke 32c forms a square-u-shape channel when viewed from the second direction y. The third yoke 32c is fixed on the movable unit 20 side of the base board 33. The third magnet 31c, the third coil 21c, and the third hall element 23c are inside the channel of the third yoke 32c in the third direction z.

The side of the third yoke 32c contacting the third magnet 31c prevents the magnetic-field of the third magnet 31c from leaking to the surroundings. The other side of the third yoke 32c raises the magnetic-flux density between the third magnet 31c and the third coil 21c and between the third magnet 31c and the third hall element 23c.

The first, the second, and the third hall elements 23a, 23b, 23c are magnetoelectric converting elements using the Hall Effect and are one-axis hall elements. The first hall element 23a detects the vertical detected-position signal py. The second hall element 23b detects the first horizontal detected-position signal px1. The third hall element 23c detects the second horizontal detected-position signal px2.

The magnetic-fields generated by the first, the second, and the third magnets 31a, 31b, 31c are used for detecting the position of the movable unit 20. The first magnet 31a and the first hall element 23a comprise a first position-detecting unit (not depicted). The second magnet 31b and the second hall element 23b comprise a second position-detecting unit (not depicted). The third magnet 31c and the third hall element 23c comprise a third position-detecting unit (not depicted).

The first hall element 23a is layered on the first coil 21a in the third direction z. In addition, the first hall element 23a is located at the first driving point 26a. Accordingly, an area in which the magnetic-field is generated for detecting a position of the movable unit 20 and an area in which the magnetic-field is generated for driving the movable unit 20 are shared. Consequently, the length of the first magnet 31a and the length of the first yoke 32a in the second direction y can be shortened.

When the center of the imaging device 48 passes through the optical axis LX before the movable unit 20 is rotated, the first hall element 23a is located at the place facing an intermediate area between the N pole and the S pole of the first magnet 31a, viewed from the third direction z. Consequently, the position-detecting operation is performed utilizing the full size of the range in which an accurate position-detecting operation can be performed based on the linear output-change of the one-axis hall element.

Similarly, when the center of the imaging device 48 passes through the optical axis LX before the movable unit 20 is rotated, the location of the second hall element 23b in the first direction x is at a plane facing an intermediate area between the N pole and the S pole of the second magnet 31b, viewed from the third direction z. When the center of the imaging device 48 passes through the optical axis LX before the movable unit 20 is rotated, the location of the third hall element 23c in the first direction x is at a place facing an intermediate area between the N pole and the S pole of the third magnet 31c, viewed from the third direction z.

The hall-element signal-processing unit 53 comprises a first, a second, and a third hall-element signal-processing circuit 54a, 54b, 54c. The first, the second, and the third hall-element signal-processing circuits 54a, 54b, 54c are connected respectively with the first, the second, and the third hall elements 23a, 23b, 23c through a flexible circuit board (not depicted).

The first hall-element signal-processing circuit 54a detects a vertical potential-difference between the output terminals of the first hall element 23a based on an output signal of the first hall element 23a. The first hall-element signal-processing circuit 54a outputs the vertical detected-position signal py to the A/D converter A/D5 of the CPU 40, based on the vertical potential-difference (see FIG. 2). The vertical detected-position signal py specifies a location of the part, of the movable unit 20, having the first hall element 23a (the point A of FIG. 5) in the second direction y.

The second hall-element signal-processing circuit 54b detects a first horizontal potential-difference between the output terminals of the second hall element 23b based on an output signal of the second hall element 23b. The second hall-element signal-processing circuit 54b outputs the first horizontal detected-position signal px1 to the A/D converter A/D3 of the CPU 40, based on the first horizontal potential-difference (see FIG. 2). The first horizontal detected-position signal px1 specifies a location of the part, of the movable unit 20, having the second hall element 23b (the point B of FIG. 5) in the first direction x.

The third hall-element signal-processing circuit 54c detects a second horizontal potential-difference between the output terminals of the third hall element 23c based on an output signal of the third hall element 23c. The third hall-element signal-processing circuit 54c outputs the second horizontal detected-position signal px2 to the A/D converter A/D4 of the CPU 40, based on the second horizontal potential-difference (see FIG. 2). The second horizontal detected-position signal px2 specifies another location of the part of the movable unit 20 comprising the third hall element 23c (the point C of FIG. 5) in the first direction x.

The three hall elements 23a, 23b, 23c are used for specifying the location and the rotation angle of the movable unit 20. The first hall element 23a specifies the location in the second direction y of one point (the points A) on the movable unit 20. The second and the third hall elements 23b, 23c specify the locations in the first direction x of two points (the points B and C) on the movable unit 20. The location of the movable unit 20 and the rotation angle of the movable unit 20 on the xy plane can be specified based on the information regarding the location in the second direction y of point A and the locations in the first direction x of points B and C.

Figure 5:
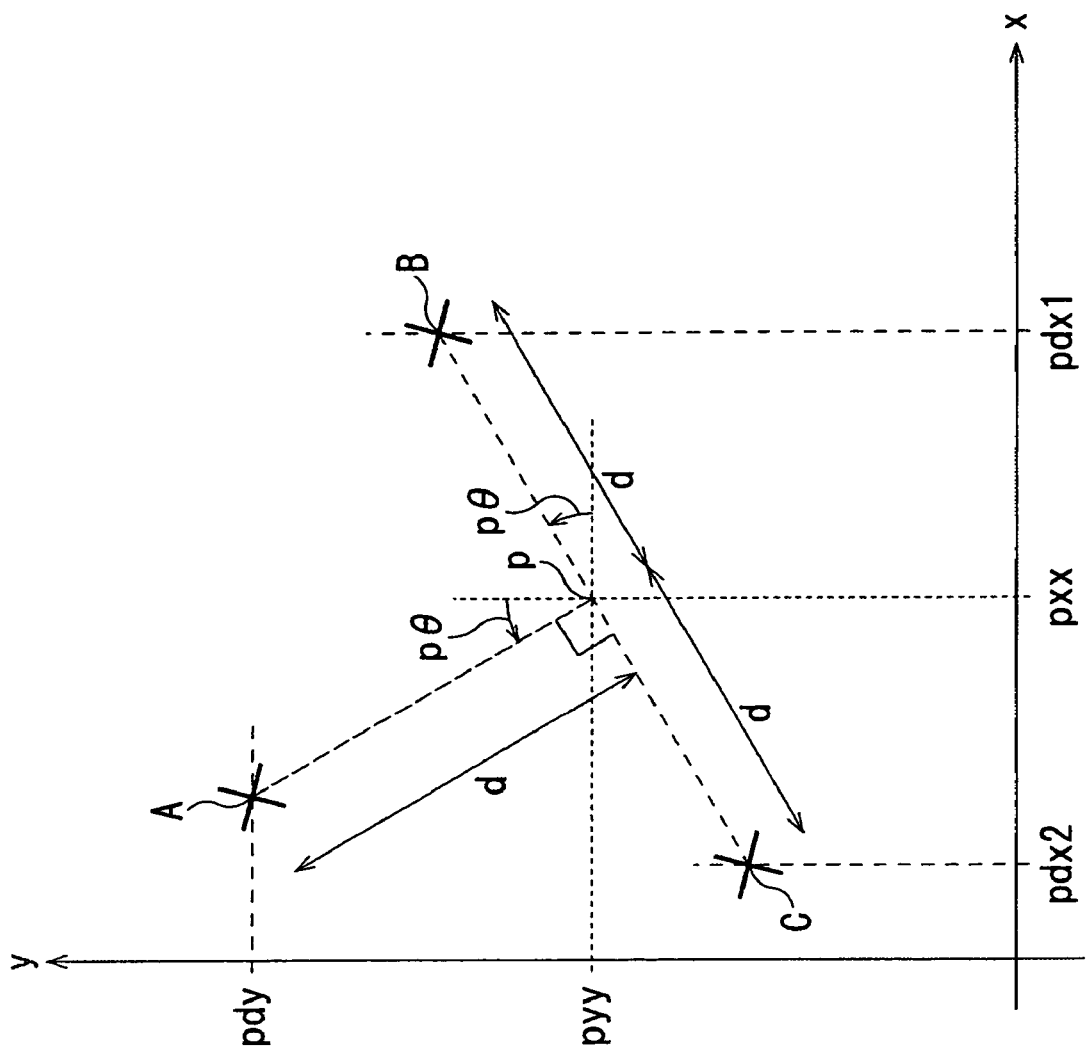
FIG. 5 is a diagram of an xy plane to explain how to calculate the position of P based on two locations in the first direction and one location in the second direction.

It is explained using FIG. 5 how to specify a location and a rotation angle of the movable unit 20. The point A, the point B, and the point C are points where the first, the second, and the third hall elements 23a, 23b, 23c are respectively located on the movable unit 20. A point intersecting a line segment BC and a line, that passes through the point A and is perpendicular to the line segment BC is defined as a point P.

The location and the rotation angle of the point P (pxx, pyy, pθ) is calculated based on the information regarding the location in the second direction y of point A and the locations in the first direction x of points B and C.

The first, the second, and the third hall elements 23a, 23b, 23c and the imaging device 48 are arranged on the movable unit 20 so that the point P agrees with an intermediate point of the line segment BC, so that the lengths of the line segment AP, the line segment BP, and the line segment CP are the same, and so that the point P agrees with the center of the imaging device 48 in the third direction z.

The location in the second direction y of the point A is detected by the first hall element 23a, as the vertical detected-position signal py. The location in the first direction x of the point B is detected by the second hall element 23b, as the first horizontal detected-position signal px1. The location in the first direction x of the point C is detected by the third hall element 23c, as the second horizontal detected-position signal px2.

As described above, the first and the second horizontal detected-position signals px1, px2 and the vertical detected-position signal py are converted respectively to pdx1, pdx2, and pdy, that are digital data. The data for the position P (pxx, pyy, pθ) are calculated with the formulas below based on the data pdx1, pdx2, pdy, and the length d of the line segment AP, BP, and CP, pxx=(pdx1+pdx2)÷2, pyy=pdy−d×cos (pθ), and Pθ=cos$^{-1}${(pdx1−pdx2)/(2×d)}. The rotation angle pθ is an angle between the line segment BP and the first direction x or between the line segment AP and the second direction y (see FIG. 5).

Next, the second embodiment is explained. In the second embodiment, structures of the coil, the magnet, the yoke, the hall element, and the hall-element signal-processing unit are different from those of the first embodiment.

Figure 6:
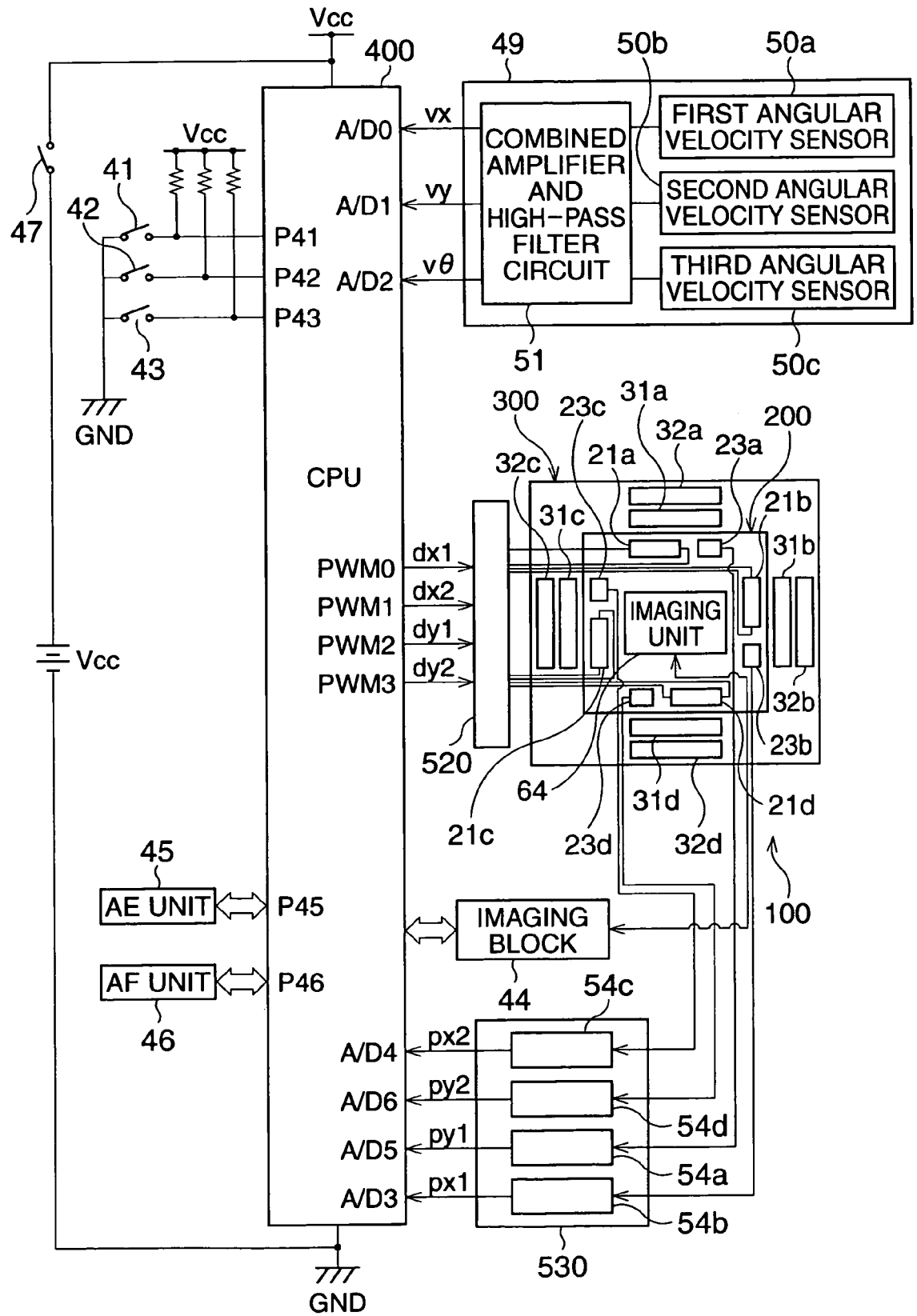
FIG. 6 is a circuit diagram showing the electrical structure of the camera in the second embodiment.
Figure 7:
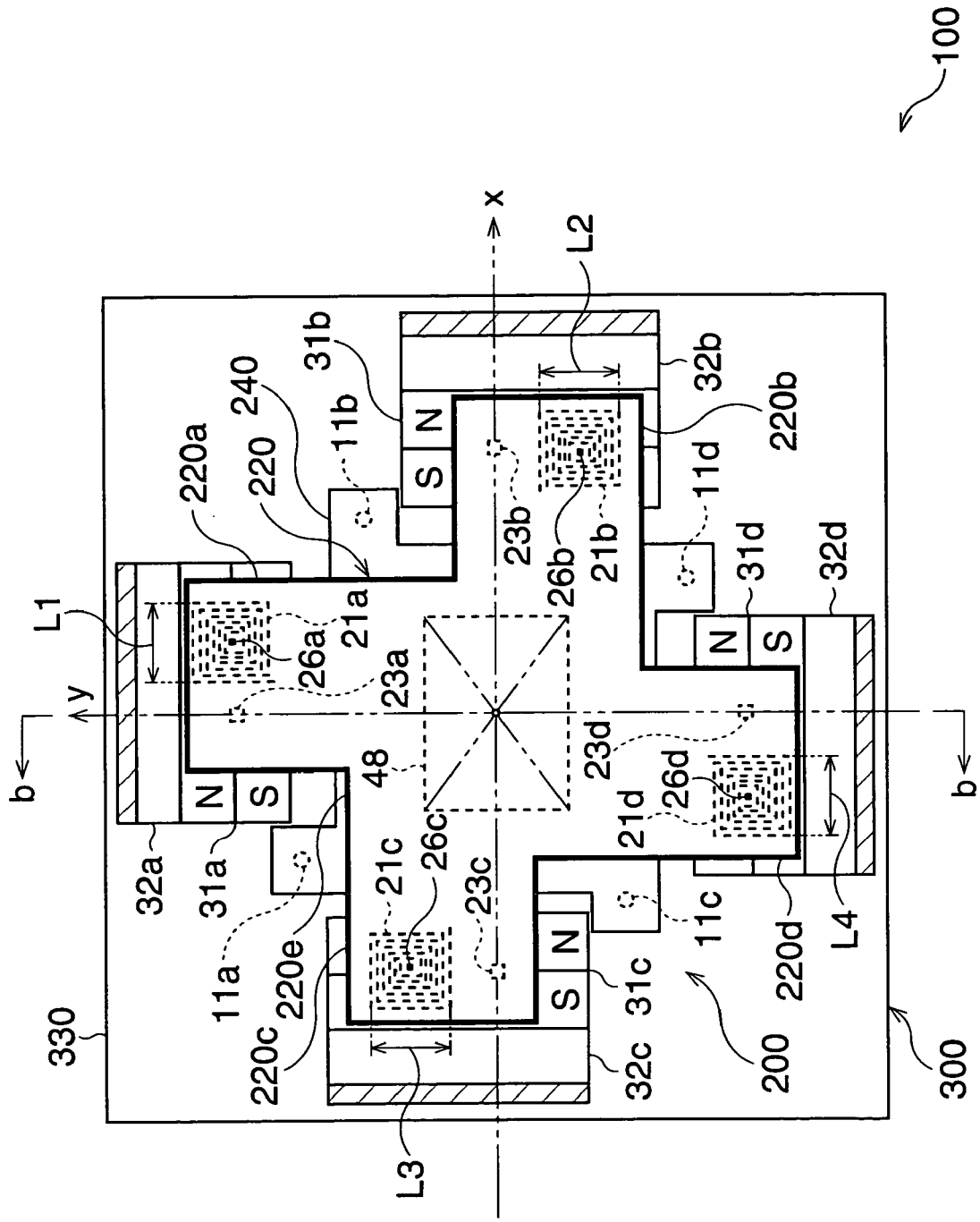
FIG. 7 is a front view of the stage driving apparatus in the second embodiment.
Figure 8:
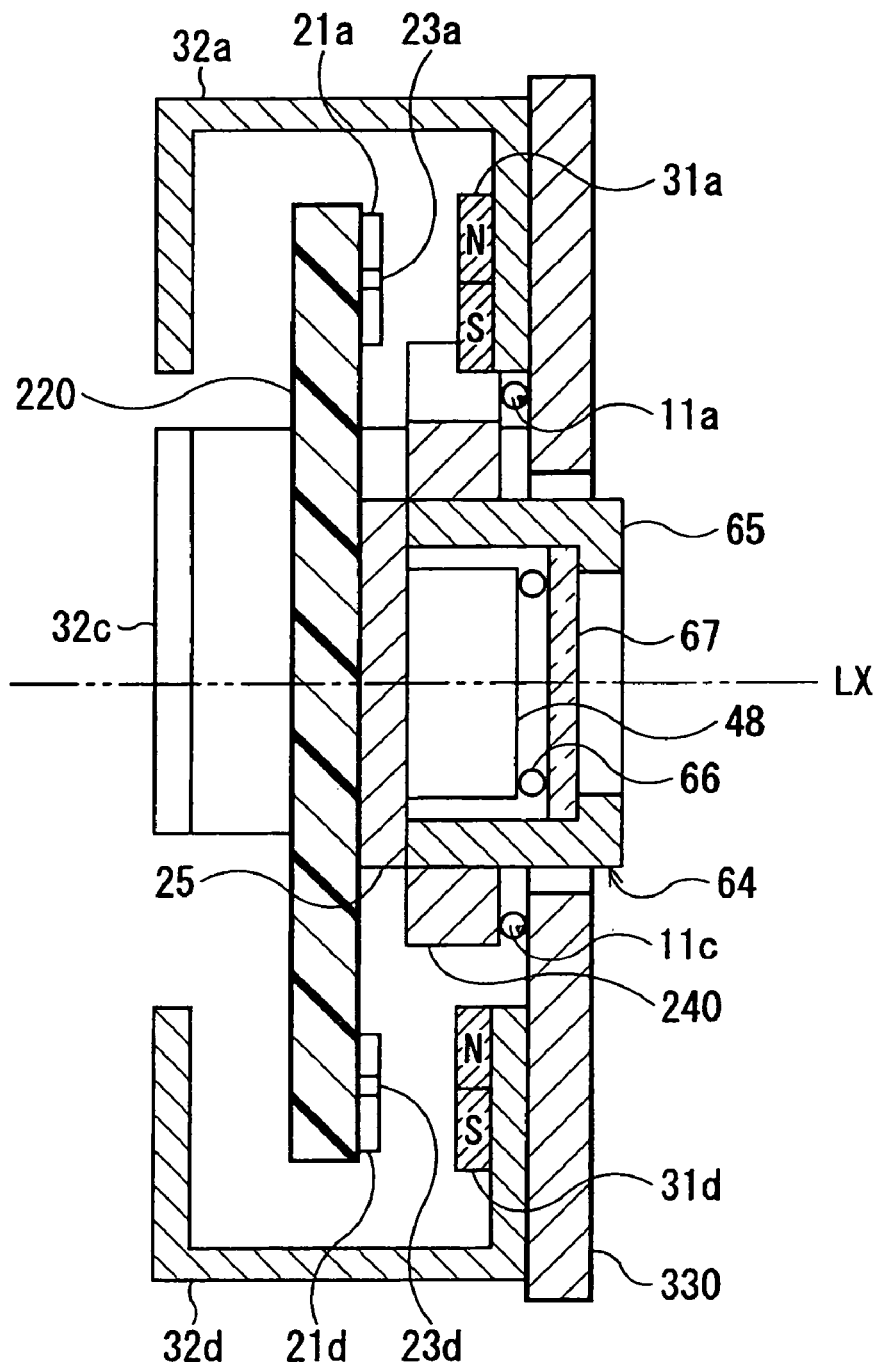
FIG. 8 illustrates a construction diagram of the section along line b-b of FIG. 7.

Therefore, the second embodiment is explained mainly with regard to the structures of the second embodiment that are different from those of the first embodiment by using FIG. 6 to 9. FIG. 8 shows the construction diagram of the section along line b-b of FIG. 7. In the second embodiment, the parts that have the same function as those of the first embodiment have the same sign.

A camera 60 of the second embodiment comprises a power-on button 61, a release button 62, an LCD monitor 63, a CPU 400, an imaging block 44, an AE unit 45, an AF unit 46, an imaging unit 64, and a camera lens 68 (see FIG. 1 and FIG. 6).

The anti-shaking part of the camera 60 comprises an anti-shaking button 69, the CPU 400, an angular velocity detecting unit 49, a driver circuit 520, a stage driving apparatus 100, a hall-element signal-processing unit 530, and the camera lens 68 (see FIG. 6).

Next, the details of the input and output relationship with the CPU 400 for the angular velocity unit 49, the driver circuit 520, the stage driving apparatus 100, and the hall-element signal-processing unit 530, are explained.

The angular velocity unit 49 outputs the first, the second, and the third angular velocities vs, vy, yθ respectively to the A/D converters A/D 0, A/D 1, A/D 2 of the CPU 400, like the first embodiment. The CPU 400 calculates the hand-shake quantity based on the first, the second, and the third angular velocities vx, vy, vθ.

The CPU 400 calculates the position S of the imaging unit 64, that should be moved to and rotated to, corresponding to the hand-shake quantity calculated, for the first direction x, the second direction y, and the rotation angle.

The movement of the movable unit 200 including the imaging unit 64 is performed by using electromagnetic force and is described later. The driving force D for moving and rotating the movable unit 200 to the position S has a first horizontal PWM duty dx1 as one of the driving-force components in the first direction x, a second horizontal PWM duty dx2 as another driving-force component in the first direction x, a first vertical PWM duty dy1 as the driving-force component in the second direction y, and a second vertical PWM duty dy2 as another driving-force component in the second direction y. The first and the second horizontal PWM duties dx1, dx2 from the PWM 0 and the PWM 1 of the CPU 400, and the first and the second vertical PWM duty dy1, dy2 from the PWM 2 and PWM 3 of the CPU 400 are input to the driving circuit 520.

The stage driving apparatus 100 comprises the movable unit 200 and a fixed unit 300. The movable unit 200 has the imaging device 48. The stage driving apparatus 100 makes the imaging unit 64 move and rotate to the position S. Owing to the movement and the rotation to the position S, a movement of the photographic image on the imaging surface of the imaging device 48 during imaging is cancelled. Then, the photographing subject image that reaches the imaging surface of the imaging device 48 is stabilized. Consequently, the hand-shake effect can be corrected, like the first embodiment.

The driving of the movable unit 200 is performed by a first, a second, a third, and a fourth driving unit. The first, the second, the third, and the fourth driving units are controlled by the driving circuit 520 based on the first and the second horizontal PWM duties dx1, dx2, and the first and the second vertical PWM duty dy1, dy2.

The detected-position P of the movable unit 200, that is moved and rotated to by the first, the second, the third, and the fourth driving units, is detected by a first, a second, a third, and a fourth hall element 23a, 23b, 23c, 23d and the hall-element signal-processing unit 530.

A first and a second horizontal detected-position signals px1, px2, that correspond to position components of the first direction x, are input respectively to the A/D converter A/D3, A/D4 of the CPU 400. A first and a second vertical detected-position signals py1, py2, that correspond to position components of the second direction y, are input to the A/D converter A/D5, A/D6 of CPU400. The first and the second horizontal detected-position signals px1, px2, that are analogue signals, are converted to digital signals respectively through the A/D converter A/D3, A/D4 (A/D converting operation). The first and the second vertical detected-position signal py1, py2, that are analogue signals, are converted to a digital signal through A/D converter A/D5, A/D6 (A/D converting operation).

A first data in the first direction x for the detected-position P, after the A/D converting operation, is defined as pdx1, corresponding to the first horizontal detected-position signal px1. A second data in the first direction x for the detected-position P, after the A/D converting operation, is defined as pdx2, corresponding to the second horizontal detected-position signal px2. A first data in the second direction y for the detected-position P, after the A/D converting operation, is defined as pdy1, corresponding to the first vertical detected-position signal py1. A second data in the second direction y for the detected-position P, after the A/D converting operation, is defined as pdy2, corresponding to the second vertical detected-position signal py2.

A first location pxx in the first direction x for the detected-position P is calculated by the CPU 400 based on the data pdx1, pdx2, pdy1, pdy2. A second location pyy in the second direction y for the detected-position P is calculated by the CPU 400 based on the data pdx1, pdx2, pdy1, pdy2. A rotation angle pθ on the xy plane for the detected-position P is calculated by the CPU 400 based on the data pdx1, pdx2, pdy1, pdy2.

Movements of the first, the second, the third, and the fourth driving units are controlled based on the data for the detected-position P (pxx, pyy, pθ) and the data for the position S (sx, sy, sθ) that should be moved to and rotated to.

The first driving unit comprises a first coil 21a and a first magnet 31a, that are used for a movement in the second direction y. The second driving unit comprises a second coil 21b and a second magnet 31b, that are used for a movement in the first direction x. The third driving unit comprises a third coil 21c and a third magnet 31c, that are used for movement in the first direction x. The fourth driving unit comprises a fourth coil 21d and a fourth magnet 31d, that are used for movement in the second direction y.

The movable unit 200 comprises a movable circuit board 220, the first, the second, the third, and the fourth coils 21a, 21b, 21c, 21d, the imaging unit 64, the first, the second, the third, and the fourth hall elements 23a, 23b, 23c, 23d, a ball-contact board 240, and a plate 25 (see FIGS. 6 and 7).

The fixed unit 300 comprises the first, the second, the third, and the fourth magnets 31a, 31b, 31c, 31d, a first, a second, a third, and a fourth yoke 32a, 32b, 32c, 32d, and a base board 330 (see FIGS. 6 and 7).

The first, the second, the third, the fourth balls 11a, 11b, 11c, 11d are held between the movable unit 200 and the fixed unit 300. The first, the second, the third, and the fourth balls 11a, 11b, 11c, 11d are located on a single plane perpendicular to the third direction z. The first, the second, the third, and the fourth balls 11a, 11b, 11c, 11d can roll between the ball-contact board 240 and the base board 330. A contact of the movable unit 200 and the fixed unit 300 is kept through the first, the second, the third, and the fourth balls 11a, 11b, 11c, 11d. The movable unit 200 is supported by the fixed unit 300 as the movable unit 200 can move in the first direction x and the second direction y and rotate along a line parallel to the optical axis LX, like the first embodiment.

The movable unit 200 is urged to the fixed unit 300 in the third direction z by an urging member, such as a spring etc., fixed in the fixed unit 300 or the camera 60, like the first embodiment. The movable and rotatable situation of the movable unit 200 on the xy plane is maintained.

The location relation between the movable unit 200 and the fixed unit 300 in the second embodiment is the same as the location relation between the movable unit 20 and the fixed unit 30 in the first embodiment.

The structure of the imaging unit 64 attached to the movable circuit board 220 in the second embodiment is the same as that of the imaging unit 64 in the first embodiment.

The movable circuit board 220 is shaped nearly like a cross-shape. The movable circuit board 220 comprises a central member 220e, a first, a second, a third, and a fourth side members 220a, 220b, 220c, 220d. The first and the fourth side members 220a, 220d are extended from the central member 220e in the second direction y. The second and the third side members 220b, 220c are extended from the central member 220e in the first direction x. The third side member 220c is shifted from the second side member 220b, viewed from the first direction x. The fourth side member 220d is shifted from the first side member 220a, viewed from the second direction y (see FIG. 7).

The imaging unit 64 is attached to the central member 220e. The first coil 21a is attached to the first side member 220a. The second coil 21b is attached to the second side member 220b. The third coil 21c is attached to the third side member 220c. The fourth coil 21d is attached to the fourth side member 220d. The first, the second, the third, and the fourth coils 21a, 21b, 21c, 21d form a sheet and a spiral shape coil pattern.

The line segments, that the first, the second, and the third coils 21a, 21b, 21c, have, in the second embodiment are the same as those of the first embodiment.

The coil pattern of the fourth coil 21d has a line segment that is parallel to the first direction x, before the movable unit 200 is rotated. The line segment that is parallel to the first direction x is used for generating a fourth electromagnetic force Pw4, of which direction is the second direction y. The movable unit 200 is moved in the second direction y by the fourth electromagnetic force Pw4.

The fourth electromagnetic force Pw4 along the second direction y occurs based on the current flowing on the line segment, that is parallel to the first direction x, of the fourth coil 21d and the magnetic field of the fourth magnet 31d.

The location relations between the first, the second, and the third driving points 26a, 26b, 26c and the first, the second, and the third coils 21a, 21b, 21c in the second embodiment are the same as those of the first embodiment.

The fourth electromagnetic force Pw4 is a resultant force, that is comprised of all the forces generated by all the line segments, parallel to the first direction x, of the fourth coil 21d. A single point considered to receive the fourth electromagnetic force Pw4 is defined as a fourth driving point 26d. The coil pattern of the fourth coil 21d is formed so as that the fourth driving point 26d is located at the center of the fourth coil 21d.

The arrangements of the second and the third coils 21b, 21c respectively on the second and the third side members 220b, 220c in the second embodiment are the same as those of the first embodiment.

The first and the fourth coils 21a, 21d are attached respectively to the first and the fourth side members 220a, 220d so that the following conditions are satisfied. One condition is that the center of the imaging device 48 agrees with the center of a line segment connecting the first and the fourth driving points 26a, 26d. Another condition is that the line segment of the first and the fourth driving points 26a, 26d crosses with a line parallel to the second direction y in the initial situation before the movable unit 200 moves and rotates. In other words, the line segment connecting the first and the fourth driving points 26a, 26d is not parallel to the second direction y in the initial situation before the movable unit 200 moves and rotates.

Therefore, the movable unit 200 can be moved on the xy plane and rotated around a line passing through the center of the imaging device 48 and being perpendicular to the xy plane, by controlling a size and a direction of the first, the second, the third, and the fourth electromagnetic forces Pw1, Pw2, Pw3, Pw4.

The first, the second, the third, and the fourth coils 21a, 21b, 21c, 21d are connected with the driver circuit 520 through a flexible circuit board (not depicted). The driver circuit 520 drives the first, the second, the third, and the fourth coils 21a, 21b, 21c, 21d. As described above, the first and the second horizontal PWM duties are input to the driver circuit 520 respectively from the PWM 0 and PWM 1 of the CPU 400. Further, the first and the second vertical PWM duty is input to the driver circuit 520 from the PWM 2 and PWM 3 of the CPU 400.

The driver circuit 520 supplies power to the first and the fourth coils 21a, 21d corresponding to the value of the first and the second vertical PWM duty dy1, dy2. The movable unit 200 is moved in the second direction y and rotated on the xy plane by the first and the fourth electromagnetic forces Pw1, Pw4 generated with the power supplied to the first and the fourth coils 21a, 21d. The driver circuit 520 supplies power to the second and the third coils 21b, 21c respectively corresponding to the value of the first and the second horizontal PWM duties dx1, dx2. The movable unit 200 is moved in the first direction x and rotated on the xy plane by the second and the third electromagnetic forces Pw2, Pw3 generated with the power supplied to the second and the third coils 21b, 21c.

When the movable unit 200 is moved in the first direction x, the control by the CPU 400 in the second embodiment is the same as that of the first embodiment.

When the movable unit 200 is moved in the second direction y, the CPU 400 controls the values of the first and the second vertical PWM duties dy1, dy2 so that the direction and the sizes of the first and the fourth electromagnetic forces Pw1, Pw4 are the same.

When the movable unit 200 is rotated on the xy plane without moving in the first direction x and in the second direction y, the CPU 400 controls the values of the first and the second horizontal PWM duties dx1, dx2 so that the directions of the second and the third electromagnetic forces Pw2, Pw3 are opposite each other and so that the sizes of the second and the third electromagnetic forces Pw2, Pw3 are the same. Or the CPU 400 controls the values of the first and the second vertical PWM duties dy1, dy2 so that the directions of the first and the fourth electromagnetic forces Pw1, Pw4 are opposite each other and so that the sizes of the first and the fourth electromagnetic forces Pw1, Pw4 are the same.

When the movable unit 200 is moved in the first direction x and rotated on the xy plane, the control by the CPU 400 in the second embodiment is the same as that of the first embodiment.

When the movable unit 200 is moved in the second direction y and rotated on the xy plane, the CPU 400 controls the first and the second vertical PWM duties dy1, dy2 so that the sizes of the first and the fourth electromagnetic forces Pw1, Pw4 are different from each other.

The first hall element 23a is attached to the first side member 220a so that the first hall element 23a is located at a point intersecting a line, that passes through the center of the imaging device 48 and is parallel to the second direction y, and a line, that passes through the first driving point 26a and is parallel to the first direction x. The fourth hall element 23d is attached to the fourth side member 220d so that the fourth hall element 23d is located at a point intersecting a line, that passes through the center of the imaging device 48 and is parallel to the second direction y, and a line, that passes through the fourth driving point 26d and is parallel to the first direction x. The arrangements of the second and the third hall elements 23b, 23c in the second embodiment are the same as those in the first embodiment.

The first, the second, the third, and the fourth yokes 32a, 32b, 32c, 32d and the first, the second, the third, and the fourth magnets 31a, 31b, 31c, 31d are attached to the base board 330 of the fixed unit 300. The arrangement of the base board 330 against the movable circuit board 220 in the second embodiment is the same as that in the first embodiment.

The location relations between the first, the second, and the third magnets 31a, 31b, 31c and the first, the second, and the third yokes 32a, 32b, 32c in the second embodiment are the same as those of the first embodiment. The fourth magnet 31d is attached to the movable unit 200 side of the fixed unit 300 through the fourth yoke 32d. The fourth magnet 31d is positioned on the fixed unit 300 so that the fourth magnet 31d faces the fourth coil 21d and the fourth hall element 23d in the third direction z.

The arrangements of the N pole and the S pole of the first, the second, and the third magnets 31a, 31b, 31c in the second embodiment are the same as those of the first embodiment. The lengths of the first, the second, and the third magnets 31a, 31b, 31c in the second embodiment are the same as those of the first embodiment.

The N pole and the S pole of the fourth magnet 31d are arranged in the second direction y. The length of the fourth magnet 31d in the first direction x is longer than the fourth effective length L4 of the fourth coil 21d in the first direction x (see FIG. 7). The magnetic-field that influences the fourth coil 21d and the fourth hall element 23d is prevented from changing during the movement of the movable unit 200 in the first direction x by the above length of the fourth magnet 31d.

The structures and the functions of the first, the second, and the third yokes 32a, 32b, 32c in the second embodiment are the same as those of the first embodiment.

The fourth yoke 32d is made of a soft magnetic material. The fourth yoke 32d forms a square-u-shape channel when viewed from the first direction x. The fourth yoke 32d is fixed on the movable unit 200 side of the base board 330. The fourth magnet 31d, the fourth coil 21d, and the fourth hall element 23d are inside the channel of the fourth yoke 32d in the third direction z.

The side of the fourth yoke 32d contacting the fourth magnet 31d prevents the magnetic-field of the fourth magnet 31d from leaking to the surroundings. The other side of the fourth yoke 32d raises the magnetic-flux density between the fourth magnet 31d and the fourth coil 21d and between the fourth magnet 31d and the fourth hall element 23d.

The first, the second, the third, and the fourth hall elements 23a, 23b, 23c, 23d are magnetoelectric converting elements using the Hall Effect and are one-axis hall elements. The first hall element 23a detects the first vertical detected-position signal py1. The second hall element 23b detects the first horizontal detected-position signal px1. The third hall element 23c detects the second horizontal detected-position signal px2. The fourth hall element 23d detects the second vertical detected-position signal py2.

The magnetic-fields generated by the first, the second, the third, and the fourth magnets 31a, 31b, 31c, 31d are used for detecting the position of the movable unit 200. The structures of the first, the second, and the third position-detecting units in the second embodiment are the same as those of the first embodiment. Similarly, the fourth magnet 31d and the fourth hall element 23d comprise a fourth position-detecting unit (not depicted).

The location relations between the first, the second, and the third hall elements 23a, 23b, 23c and the first, the second, and the third magnets 31a, 31b, 31c in the second embodiment are the same as those of the first embodiment.

When the center of the imaging device 48 passes through the optical axis LX before the movable unit 200 is rotated, the fourth hall element 23d is located at a place facing an intermediate area between the N pole and the S pole of the fourth magnet 31d, viewed from the third direction z.

The hall-element signal-processing unit 530 comprises first, second, third, and fourth hall-element signal-processing circuits 54a, 54b, 54c, 54d. The first, the second, the third, and the fourth hall-element signal-processing circuits 54a, 54b, 54c, 54d are respectively connected with the first, the second, the third, and the fourth hall elements 23a, 23b, 23c, 23d through a flexible circuit board (not depicted).

The first hall-element signal-processing circuit 54a detects a first vertical potential-difference between the output terminals of the first hall element 23a based on an output signal of the first hall element 23a. The first hall-element signal-processing circuit 54a outputs the first vertical detected-position signal py1 to the A/D converter A/D5 of the CPU 400, based on the first vertical potential-difference. The first vertical detected-position signal py1 specifies a location of the part of the movable unit 200 comprising the first hall element 23a (the point A' of FIG. 9) in the second direction y.

The fourth hall-element signal-processing circuit 54d detects a second vertical potential-difference between the output terminals of the fourth hall element 23d based on an output signal of the fourth hall element 23d. The fourth hall-element signal-processing circuit 54d outputs the second vertical detected-position signal py2 to the A/D converter A/D6 of the CPU 400, based on the second vertical potential-difference. The second vertical detected-position signal py2 specifies a location of the part of the movable unit 200 comprising the fourth hall element 23d (the point D' of FIG. 9) in the second direction y.

The detected-position signal output from the second and third hall-element signal-processing circuits 54b, 54c, is the same as those of the first embodiment.

The four hall elements 23a, 23b, 23c, 23d are used for specifying the location and the rotation angle of the movable unit 200. The first and the fourth hall elements 23a, 23d specify the locations in the second direction y of two points (the points A' and D') on the movable unit 200. The second and the third hall elements 23b, 23c specify the locations in the first direction x of two points (the points B' and C') on the movable unit 200. The location of the movable unit 200 and the rotation angle of the movable unit 200 on the xy plane can be specified based on the information regarding the locations in the second direction y of point A' and D' and the locations in the first direction x of points B' and C'.

Figure 9:
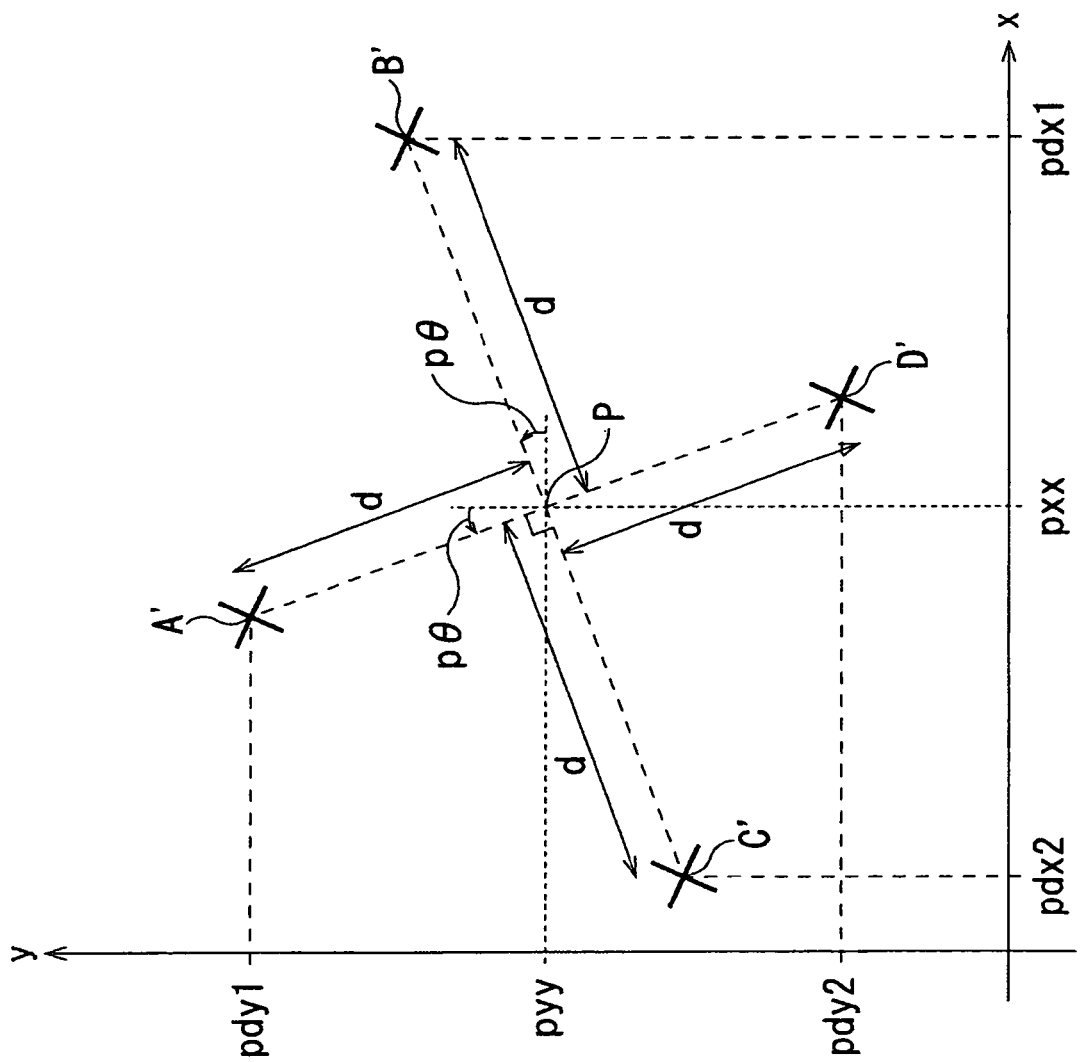
FIG. 9 is a diagram of an xy plane to explain how to calculate the position of P based on two locations in the first direction and two locations in the second direction.

It is explained using FIG. 9 how to specify a location and a rotation angle of the movable unit 200. The point A', the point B', the point C', and the point D' are points where the first, the second, the third, and the fourth hall elements 23a, 23b, 23c, 23d are respectively located on the movable unit 200. A point intersecting a line segment B'C' and a line segment A'D' is defined as a point P.

The location and the rotation angle of the point P (pxx, pyy, pθ) is calculated based on the information regarding the locations in the second direction y of point A' and D' and the locations in the first direction x of points B and C.

The first, the second, the third, and the fourth hall elements 23a, 23b, 23c, 23d and the imaging device 48 are arranged on the movable unit 200 so that the point P agrees with the intermediate points of the line segment A'D' and the line segment B'C', and so that the point P agrees with the center of the imaging device 48 in the third direction z.

The locations of the point A', the point B', and the point C' are detected in the second embodiment in the same way as in the first embodiment. The location in the second direction y of the point D is detected by the fourth hall element 23d, as the second vertical detected-position signal py2.

As described above, the first and second horizontal detected-position signals px1, px2 and the first and second vertical detected-position signal py1, py2 are respectively converted to pdx1, pdx2, and pdy1, pdy2, that are digital data.

The data for the position P (pxx, pyy, pθ) are calculated with the formulas below based on the data pdx1, pdx2, pdy1, pdy2, and the length d of the line segment A'P, B'P, C'P, D'P, pxx= (pdx1+pdx2)÷2, pyy=(pdy1+pdy2)÷2, and Pθ=cos$^{-1}${(pdx1−pdx2)/(2×d)}=cos$^{-1}$ {(pdy1−pdy2)/(2×d)}. The rotation angle pθ is an angle between the line segment B'P and the first direction x or between the line segment A'P and the second direction y (see FIG. 9).

Next, the third embodiment is explained. In the third embodiment, the arrangements of the first and the fourth coils, magnets, yokes, and hall elements are different from those of the second embodiment.

Figure 10:
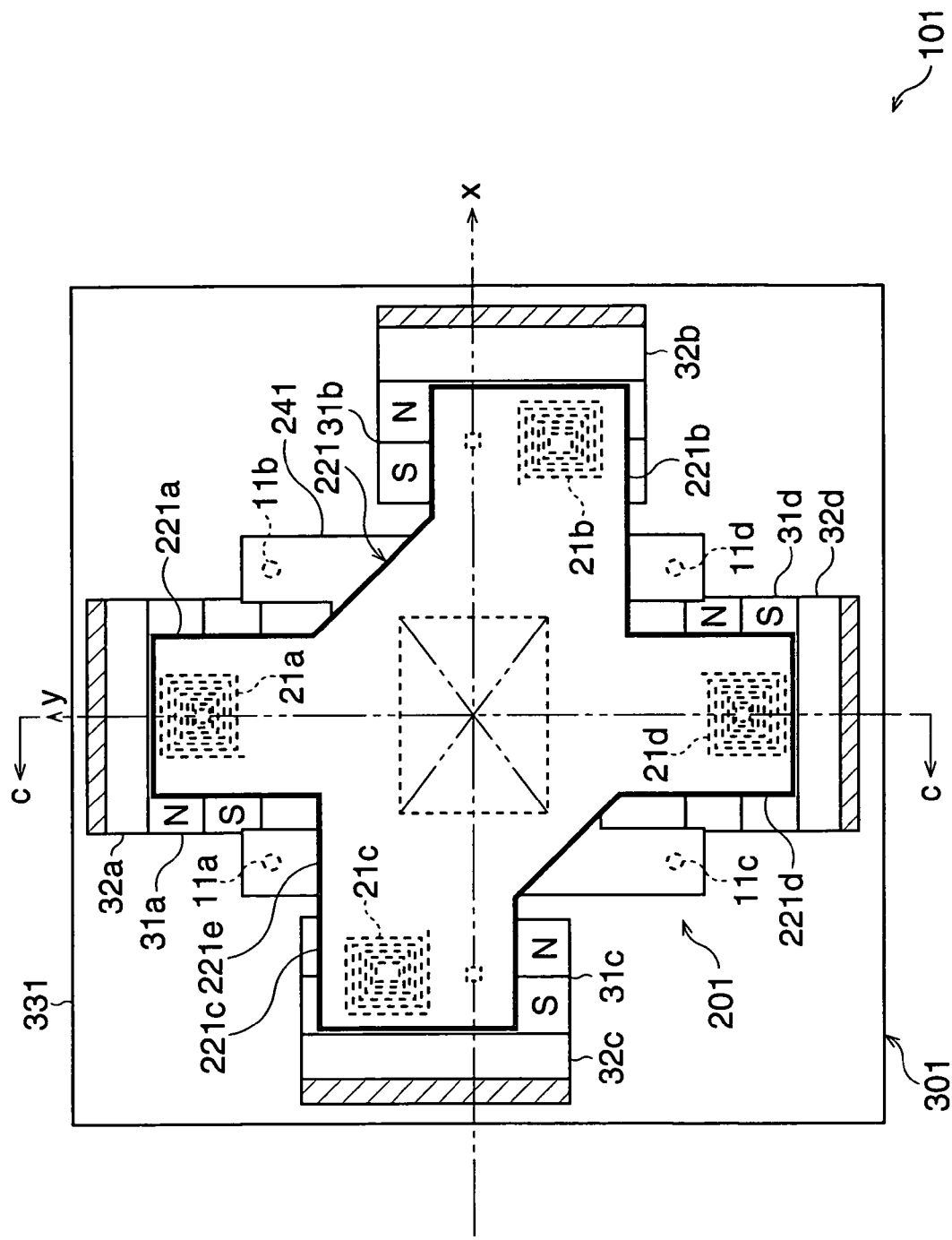
FIG. 10 is a front view of the stage driving apparatus in the third embodiment.
Figure 11:
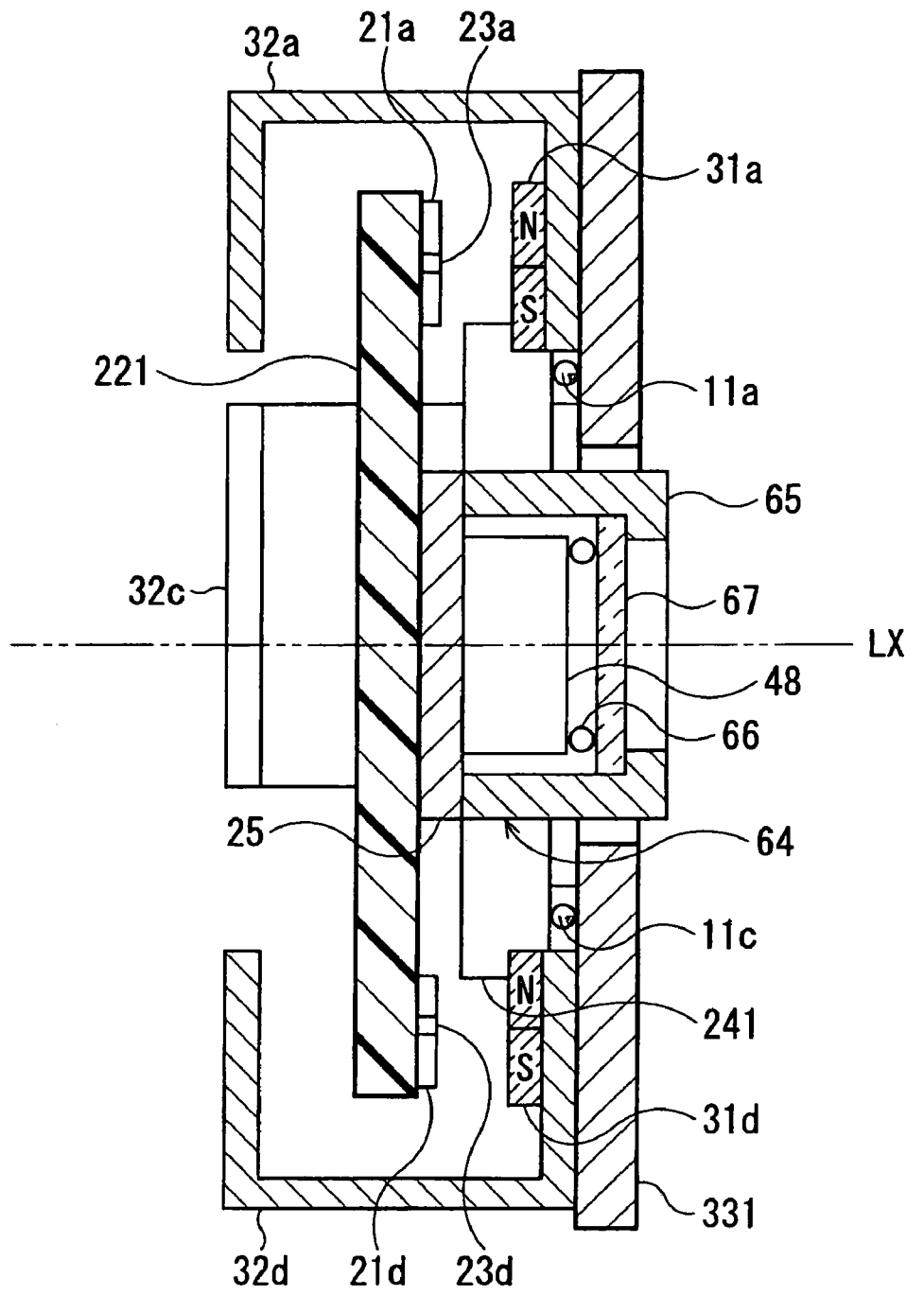
FIG. 11 illustrates a construction diagram of the section along line c-c of FIG. 10.

Therefore, the third embodiment is explained mainly with regard to the structures of the third embodiment that are different from those of the second embodiment, by using FIGS. 10 and 11. FIG. 11 shows the construction diagram of the section along line c-c of FIG. 10. In the third embodiment, the parts that have the same function as those of the second embodiment have the same sign.

An electrical structure of the third embodiment is the same as that of the second embodiment. The structure of the anti-shaking part of the camera 60 of the third embodiment is the same as that of the second embodiment, except for the structure of the stage driving apparatus 101

The stage driving apparatus 101 comprises the movable unit 201 and a fixed unit 301. The movable unit 201 has the imaging device 48. The stage driving apparatus 101 makes the imaging unit 64 move and rotate to the position S, in a similar way to the second embodiment. The driving of the movable unit 201 is performed by first, second, third, and fourth driving units, in a similar way to the second embodiment. The detected position P of the movable unit 201 is detected by first, second, third, and fourth hall elements 23a, 23b, 23c, 23d and the hall-element signal-processing unit, in a similar way to the second embodiment. The structures of the first, the second, the third, and the fourth driving units are the same as those of the second embodiment.

The movable unit 201 comprises a movable circuit board 221, the first, the second, the third, and the fourth coils 21a, 21b, 21c, 21d, the imaging unit 64, the first, the second, the third, and the fourth hall elements 23a, 23b, 23c, 23d, a ball-contact board 241, and a plate 25, in a similar way to the second embodiment (see FIGS. 10 and 11).

The fixed unit 301 comprises the first, the second, the third, and the fourth magnets 31a, 31b, 31c, 31d, first, second, third, and fourth yokes 32a, 32b, 32c, 32d, and a base board 331, in a similar way to the second embodiment (see FIGS. 10 and 11).

The first, the second, the third, and the fourth balls 11a, 11b, 11c, 11d are held between the movable unit 201 and the fixed unit 301, in a similar way to the second embodiment. The first, the second, the third, and the fourth balls 11a, 11b, 11c, 11d are located on a single plane perpendicular to the third direction z. The first, the second, the third, and the fourth balls 11a, 11b, 11c, 11d can roll between the ball-contact board 241 and the base board 331. Contact between the movable unit 201 and the fixed unit 301 is kept through the first, the second, the third, and the fourth balls 11a, 11b, 11c, 11d. The movable unit 201 is supported by the fixed unit 301 as the movable unit 201 can move in the first direction x and the second direction y and rotate along a line parallel to the optical axis LX, in a similar way to the first embodiment, and the second embodiment.

The movable unit 201 is urged to the fixed unit 301 in the third direction z by an urging member, such as a spring etc., fixed in the fixed unit 301 or the camera 60, like the second embodiment.

The location relation between the movable unit 201 and the fixed unit 301 in the third embodiment is the same as the location relation between the movable unit 200 and the fixed unit 300 in the second embodiment.

The structure of the imaging unit 64 attached to the movable circuit board 221 in the third embodiment is the same as that of the imaging unit 64 in the second embodiment.

The movable circuit board 221 is shaped almost like a cross-shape. The movable circuit board 221 comprises a central member 221e, first, second, third, and fourth side members 221a, 221b, 221c, 221d. The first and fourth side members 221a, 221d are extended from the central member 221e in the second direction y. The second and the third side members 221b, 221c are extended from the central member 221e in the first direction x. The third side member 220c is shifted from the second side member 220b viewed from the first direction x, in a similar way to the second embodiment (see FIG. 10).

The line segments, that the first, the second, the third, and the fourth coils 21a, 21b, 21c, 21d have, in the third embodiment are the same as those of the second embodiment.

The location relations between the first, the second, the third, and the fourth driving points 26a, 26b, 26c, 26d and the first, the second, the third, and the fourth coils 21a, 21b, 21c, 21d in the third embodiment are the same as those of the second embodiment.

The arrangements of the second and the third coils 21b, 21c respectively on the second and the third side members 221b, 221c in the third embodiment are the same as those in the second embodiment.

The first and the fourth coils 21a, 21d are respectively arranged on the first and the fourth side members 221a, 221d so that the following conditions are satisfied. One condition is that the center of the imaging device 48 agrees with the center of a line segment connecting the first and the fourth driving points 26a, 26d. Another condition is that the line segment connecting the first and the fourth driving points 26a, 26d is parallel to the second direction y in the initial situation before the movable unit 201 moves and rotates.

Therefore, the movable unit 201 also can be moved on the xy plane and rotated around a line passing through the center of the imaging device 48 and being perpendicular to the xy plane, by controlling a size and direction of the first, the second, the third, and the fourth electromagnetic forces Pw1, Pw2, Pw3, Pw4, as in the second embodiment.

The driver circuit 520 supplies power to the first and the fourth coils 21a, 21d corresponding to the value of the first and the second vertical PWM duties dy1, dy2. The movable unit 201 is moved in the second direction y by the first and the fourth electromagnetic forces Pw1, Pw4 generated with power supplied to the first and the fourth coils 21a, 21d. The driver circuit 520 supplies power to the second and third coils 21b, 21c respectively corresponding to the value of the first and the second horizontal PWM duties dx1, dx2. The movable unit 201 is moved in the first direction x and rotated on the xy plane by the second and the third electromagnetic forces Pw2, Pw3 generated with a power supplied to the second and the third coils 21b, 21c.

When the movable unit 201 is moved in the first direction x, the control by the CPU 400 in the third embodiment is the same as that of the first embodiment.

When the movable unit 201 is moved in the second direction y, the CPU 400 controls at least one value either the first or the second vertical PWM duties dy1, dy2 in order to generate the first or the fourth electromagnetic forces Pw1, Pw4.

When the movable unit 201 is rotated on the xy plane without moving in the first direction x, the control by the CPU 400 in the third embodiment is the same as that of the first embodiment.

The arrangements of the first, the second, and the third hall elements 23a, 23b, 23c are the same as those of the first embodiment. The fourth element 23d is attached to the fourth side member 221d so that the fourth hall element 23d agrees with the fourth driving point 26d in the third direction z.

In the first, the second, and the third embodiments, the movable unit can be rotated on the xy plane by the coils, the magnets, and the yokes that are used for moving the movable unit in the first direction x and in the second direction y. Consequently, the movement apparatus for rotating and the moving apparatus for the linear movement become one body. Therefore, the stage driving apparatus can be downsized.

Further, the rotation angle of the movable unit can be detected by using the hall elements, the magnets and the yokes, which are used for detecting the location of the movable unit in the first direction x and the second direction y. Consequently, the position-detecting apparatus for the rotating and the position-detecting apparatus for the linear movement become one body. Therefore, the stage driving apparatus having position-detecting function can be downsized.

Further, the movable unit can be moved in the first direction x by the driving unit attached on the side member extending from the central member in the first direction. Consequently, the magnet being part of the driving unit and attached on the side member extending from the central member in the first direction x does not have to be lengthened in the first direction x. Similarly, the movable unit can be moved in the second direction y by the driving unit attached on the side member extending from the central member in the second direction y. Consequently, the magnet being part of the driving unit attached on the side member extending from the central member in the second direction y does not have to be lengthened in the second direction x. Therefore, the stage driving apparatus can be further downsized both in the first direction x and in the second direction y.

Figure 12:
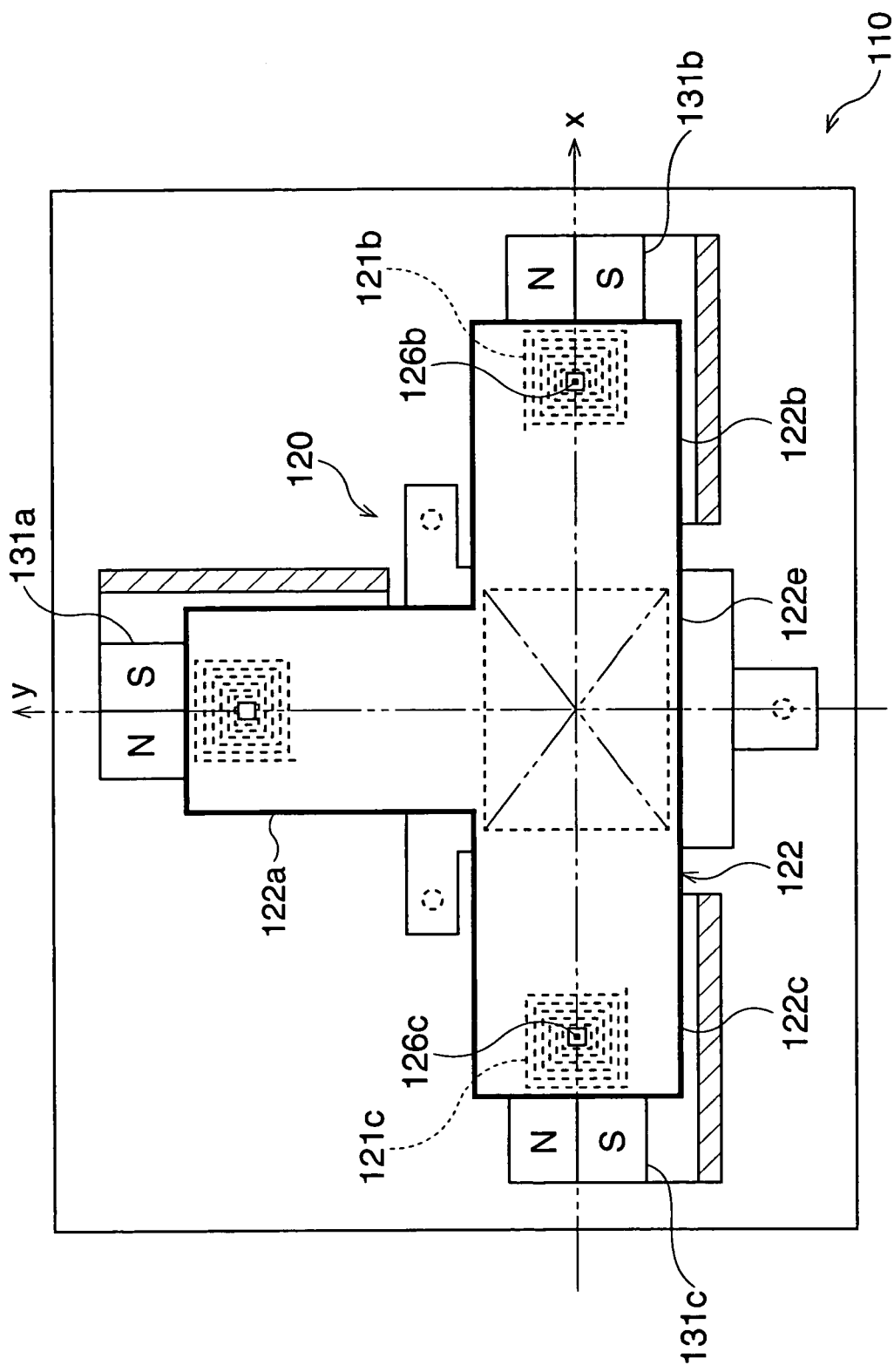
FIG. 12 is a front view of the reference stage driving apparatus for explaining the effect of the stage driving apparatus in the first, the second, and the third embodiments.

The method for further downsizing described above is explained below in detail comparing another stage driving apparatus, hereinafter referred to as a reference stage driving apparatus, shown in FIG. 12.

It is necessary to lengthen a length of a magnet and a coil in the direction perpendicular to the direction of an electromagnetic force in order to enlarge the size of the electromagnetic force.

The movable circuit board 122 of the reference stage driving apparatus 110 comprises a central member 122e, and first, second, and third side members 122a, 122b, 122c. The first side member 122a extends from the central member 122e in the second direction y. The second and the third side members 122b, 122c extend from the central member 122e in the first direction x. The first driving unit, for the movement in the first direction x is attached to the first side member 122a. The second and the third driving units, for the movement in the second direction y are respectively attached to the second and the third side members 122b, 122c. The second and the third coils 121b, 121c are positioned so that the line segment connecting the second and the third driving points 126b, 126c is perpendicular to the second direction y.

The moving apparatus for the rotating, and the moving apparatus for the linear movement, can become one body, even for the structure of the reference stage driving apparatus 110. However, the length of the first magnet 131a in the second direction y and the lengths of the second and the third magnets 131b, 131c in the first direction x should be longer than those of the first, second, and third embodiments. Consequently, it is difficult for the reference stage driving apparatus 110 to further downsize. On the other hand, the movable unit can be moved and rotated without lengthening the length, in the first direction x, of the magnet facing the second and the third side members, that extend from the central member in the first direction x and without lengthening the length, in the second direction y, of the magnet facing the first side member that extends from the central member in the second direction y. Therefore, the stage driving apparatus, of the first, the second, or the third embodiment, can be downsized from the reference stage driving apparatus 110.

The magnets and yokes that are used for moving the movable unit may be separated from the magnets and the yokes that are used for detecting the position of the movable unit. However, the magnet or the yoke are one body in order to detect the location and to move the movable unit, so that the size of the stage driving apparatus is reduced, in comparison with when the magnet or the yoke is a separated body in order to detect the location and to move the movable unit.

The number of the points, where the movable unit receives the electromagnetic force, is 3 in the first embodiment. However, the number of points, where the movable unit of the first embodiment receives the electromagnetic force, may be equal to or more than 3, under the following three conditions. One condition is that the number of points, where the movable unit receives the electromagnetic force in one of the first direction x and the second direction y, is equal to or more than 2. Another condition is that the number of points, where the movable unit receives the electromagnetic force in another of the first direction x and the second direction y, is equal to or more than 1. And the other condition is that the line segment connecting the two points, where the movable unit receives the electromagnetic force in the same direction, intersects the direction of the electromagnetic force. In other words, the line segment is not parallel to the direction of the electromagnetic force.

Similarly, the number of points, where the movable unit receives the electromagnetic force, is 4 in the second and third embodiments. However, the number of points, where the movable unit of the second and the third embodiments receives the electromagnetic force, may be equal to or more than 4.

The number of the points, that are used for the position-detecting operation on the movable unit, is 3 in the first embodiment. The number of the points, that are used for the position-detecting operation on the movable unit, is 4 in the second and the third embodiments. However, the number of points, that are used for the position-detecting operation on the movable unit, may be equal to or more than 3, under the following conditions. One condition is that the number of points, which are used for the position-detecting operation in one of the first direction x and the second direction y, is elual to or more than 2. The other condition is that the number of points, which are used for the position-detecting operation in another of the first direction x and the second direction y, is equal to or more than 1.

The anti-shaking part is formed by attaching the imaging device to the stage driving apparatus in the first, the second, and the third embodiments. However, a hand-shake correcting lens instead of the imaging device may be attached to the stage driving apparatus. The anti-shaking part comprising the stage driving apparatus having the hand-shake correcting lens can correct the hand shake effect.

The coils and the magnets are respectively attached to the movable unit and the fixed unit in the first, the second, and the third embodiments. However, the coils and the magnets are respectively attached to the fixed unit and the movable unit. Further, the hall elements and the magnets are respectively attached to the movable unit and the fixed unit in the first, the second, and the third embodiments. However, the hall elements and the magnets are attached respectively to the fixed unit and the movable unit.

The magnets generating a magnetic field in the first, the second, and the third embodiments may be permanent magnets which always generate the magnetic field, or electric magnets which generate the magnetic field when it is needed.

The hall elements are used for position-detecting as the magnetic-field change-detecting elements in the first, the second, and the third embodiments. However, another detecting element may be used for position-detecting. Specifically, the detecting element may be an MI (Magnetic Impedance) sensor, in other words a high-frequency carrier-type magnetic-field sensor, a magnetic resonance-type magnetic-field detecting element, or an MR (Magneto Resistance effect) element.

The second and the third driving points are arranged so that the center of the movable range of the movable circuit board is located between the second and the third driving points, in the first, the second, and the third embodiments. However, the second and the third driving points may be arranged so that the center of gravity of the movable circuit board is located between the second and the third driving points. Or both the second and the third coils may be attached and the second and the third driving points may be arranged on either the second or the third side members extending from the central member in the first direction x under the condition that the line segment connecting the second and the third driving points is not parallel to the first direction x.

The base board is arranged between the movable circuit board and the camera lens in the first, the second, and the third embodiments. However, the circuit board may be arranged between the base board and the camera lens.

The number of the balls held between the movable unit and the fixed unit is 3 in the first embodiment. However, the number of the balls held between the movable unit and the fixed unit may be equal to or more than 3.

The movable circuit board is shaped almost like the letter T in the first embodiment. However, any shape may be applicable to the first embodiment under the condition that the places where the coils and the hall elements are attached to on the movable circuit board satisfy the above arrangement conditions of the coils and the hall elements.

The movable circuit board is shaped almost like a cross-shape in the second and the third embodiments. However, any shape may be applicable to the second and the third embodiments under the condition that the places where the coils and the hall elements are attached to on the movable circuit board satisfy the above arrangement conditions of the coils and the hall elements.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-277731 (filed on Sep. 24, 2004), which is expressly incorporated herein, by reference, in its entirety.

The invention claimed is:

1. A stage driving apparatus, comprising:
a movable unit configured to move in a first direction and in a second direction different from said first direction, and to be rotatable on a movable-plane that is parallel both to said first and to said second directions;
a fixed unit configured to support said movable unit as said movable unit is moved in said first and said second directions and rotated on said movable-plane;
a first driving unit configured to supply a first driving force in said second direction to said movable unit;
a second driving unit configured to supply a second driving force in said first direction to said movable unit:
a third driving unit configured to supply a third driving force in said first direction to said movable unit: and
a controller configured to control said first, said second, and said third driving forces;
said first, said second, and said third driving units being attached to one of said movable unit and said fixed unit;
a point, on said movable unit, that receives said second driving force from said second driving unit, comprising a second driving point;
another point, on a said movable unit, that receives said third driving force from said third driving unit comprising a third driving point; and
a line segment connecting said second and said third driving points not being parallel to said first direction.

2. A stage driving apparatus according to claim 1, wherein said first driving unit comprises a first coil and a first driving-magnet configured to generate a first electromagnetic force in said second direction in order to supply said movable unit with said first driving force, said second driving unit comprises a second coil and a second driving-magnet used for generating a second electromagnetic force in said first direction in order to supply said movable unit with said second driving force, and said third driving unit comprises a third coil and a third driving-magnet used for generating a third electromagnetic force in said first direction in order to supply said movable unit with said third driving force.

3. A stage driving apparatus according to claim 2, wherein said first, said second, and said third coils are attached to one of said movable unit and said fixed unit, and said first, said second, and said third driving-magnets are attached to the other of said movable unit and said fixed unit.

4. A stage driving apparatus according to claim 2, wherein said first, said second, and said third coils are arranged so that said first, said second, and said third coils, respectively, face said first, said second, and said third driving-magnets in a third direction perpendicular to said movable-plane.

5. A stage driving apparatus according to claim 4, further comprising a fourth coil and a fourth driving-magnet configured to generate a fourth electromagnetic force in said second direction in order to supply said movable unit with a fourth driving force; and
said fourth coil being arranged so that said fourth coil faces said fourth driving-magnet in said third direction.

6. A stage driving apparatus according to claim 5, wherein
a point on a said movable unit that receives said first driving force from said first driving unit comprises a first driving point,
another point on said movable unit that receives said fourth driving force from said fourth driving unit being comprises a fourth driving point,
said first and said fourth driving points being arranged so that one of a center of a movable range on a movable-plane of said movable unit and a center of gravity of said movable unit is between said first and said fourth driving points, and a line segment connecting said first and said fourth driving points is not parallel to said second direction.

7. A stage driving apparatus according to claim 6, wherein
when said movable unit is moved in said second direction, said controller controls said first and said fourth electromagnetic forces so that the directions and the sizes of said first and said fourth electromagnetic forces are the same, when said movable unit is moved in said first direction, said controller controls said second and said fourth electromagnetic forces so that the directions and the sizes of said second and said third electromagnetic forces are the same, when said movable unit is rotated on said movable-plane without moving in said first and said second directions, said controller controls said first and said fourth electromagnetic forces so that the directions of said first and said fourth electromagnetic forces are opposite each other and so that the sizes of said first and said fourth electromagnetic forces are the same, or said controller controls said second and said third electromagnetic forces so that the directions of said second and said third electromagnetic forces are opposite each other and so that the sizes of said second and said third electromagnetic forces are the same, when said movable unit is moved in said second direction and rotated on said movable plane, said controller controls said first and said fourth electromagnetic forces so that the sizes of said first and said fourth electromagnetic forces are different, and when said movable unit is moved in said first direction and rotated on said movable-plane, said controller controls said second and said third electromagnetic forces so that the sizes of said second and said third electromagnetic forces are different.

8. A stage driving apparatus according to claim 5, wherein a point on said movable unit that receives said first driving force from said first driving unit is defined as a first driving point, another point on said movable unit that receives said fourth driving force from said fourth driving unit is defined as a fourth driving point, and a line segment connecting said first and said fourth driving points is parallel to said second direction.

9. A stage driving apparatus according to claim 8, wherein
when said movable unit is moved in said second direction, said controller controls at least one of said first and said fourth electromagnetic forces, when said movable unit is moved in said first direction, said controller controls said second and said third electromagnetic forces so that the directions and the sizes of said second and said third electromagnetic forces are the same, when said movable unit is rotated on said movable-plane without moving in said first and said second directions, said controller controls said second and said third electromagnetic forces so that the directions of said second and said third electromagnetic forces are opposite each other and so that the sizes of said second and said third electromagnetic forces are the same, and when said movable unit is moved in said first direction and rotated on said movable-plane, said controller controls said second and said third electromagnetic forces so that the sizes of said second and said third electromagnetic forces are different.

10. A stage driving apparatus according to claim 2, wherein a coil pattern of said first coil has a line segment that is perpendicular to said second direction, another coil pattern of said second coil has a line segment that is perpendicular to said first direction, another coil pattern of said third coil has a line segment that is perpendicular to said first direction, an N pole and an S pole of said first driving-magnet being arranged in said second direction, an N pole and an S pole of said second driving-magnet being arranged in said first direction, and an N pole and an S pole of said third driving-magnet being arranged in said first direction.

11. A stage driving apparatus according to claim 2, wherein
when said movable unit is moved in said first direction, said controller controls said second and said third electromagnetic forces so that the directions and the sizes of said second and said third electromagnetic forces are the same;

when said movable unit is rotated on said movable-plane without moving in said first direction, said controller controls said second and said third electromagnetic forces so that the directions of said second and said third electromagnetic forces are opposite to each other, and so that the sizes of said second and said third electromagnetic forces are the same; and when said movable unit is moved in said first direction and rotated on said movable-plane, said controller controls said second and said third electromagnetic forces so that the sizes of said second and said third electromagnetic forces are different.

12. A stage driving apparatus according to claim 1, further comprising:
a first position-detector configured to detect a location of a first member of said movable unit in said first direction against said fixed unit;
a second position-detector configured to detect a location of a second member of said movable unit in said second direction against said fixed unit; and
a third position-detector configured to detect a location of a third member of said movable unit in said first or said second direction against said fixed unit.

13. A stage driving apparatus according to claim 12, wherein said first position-detector comprises a first magnetic-field change-detecting element and a first detecting-magnet configured to detect a location of said first member in said first direction, said second position-detector comprises a second magnetic-field change-detecting element and a second detecting-magnet configured to detect a location of said second member in said first direction, and said third position-detector comprises a third magnetic-field change-detecting element and a third detecting-magnet configured to detect a location of said third member in said first direction.

14. A stage driving apparatus according to claim 13, wherein said first detecting-magnet with a first coil comprises said first driving unit generating a first electromagnetic force in said second direction in order to supply said movable unit as said first driving force, said second detecting-magnet with a second coil comprises said second driving unit generating a second electromagnetic force in said first direction in order to supply said movable unit with said second driving force, and said third detecting-magnet with a third coil comprises said third driving unit generating a third electromagnetic force in said first direction in order to supply said movable unit with said third driving force.

15. A stage driving apparatus according to claim 1, wherein said first direction is perpendicular to said second direction.

16. A stage driving apparatus according to claim 1, further comprising:

more than three balls that are movably held between said movable unit and said fixed unit; and an urging member configured to urge said movable unit in a third direction perpendicular to said movable-plane.

17. A stage driving apparatus according to claim 1, wherein a point on a said movable unit that receives said first driving force from said first driving unit comprises a first driving point, and said second and said third driving points are arranged so that one of a center of a movable range on said movable-plane of said movable unit and a center of gravity of said movable unit is located between said second and said third driving points, and said first driving point being arranged in said second direction from one of said center of a movable range and said center of gravity.

18. A stage driving apparatus according to claim 17, wherein an intermediate point of a line segment connecting said second and said third driving points with one of said center of a movable range and said center of gravity, and a line segment, that connects said first driving point and one of said center of a movable range and said center of gravity, is parallel to said second direction before said movable unit is moved and rotated on said movable-plane.

19. A stage driving apparatus according to claim 1, wherein a line segment connecting said second and said third driving points is not perpendicular to said first direction.

20. An anti-shake apparatus, comprising:

a movable unit comprising one of an imaging device and a hand-shake correcting lens and configured to move in a first direction perpendicular to an optical axis of a camera lens and in a second direction, perpendicular to said optical axis and being different from said first direction, and that can be rotated around a rotation-axis parallel to said optical axis;

a fixed unit configured to support said movable unit while said movable unit is moved in said first and said second directions and rotated around said rotation-axis;

a first driving unit configured to supply a first driving force in said second direction to said movable unit;

a second driving unit configured to supply a second driving force in said first direction to said movable unit:

a third driving unit configured to supply a third driving force in said first direction to said movable unit:

a controller configured to control said first, said second, and said third driving forces; and said first, said second, and said third driving units being attached to one of said movable unit and said fixed unit;

a point on a said movable unit that receives said second driving force from said second driving unit comprises a second driving point;

another point on a said movable unit that receives said third driving force from said third driving unit comprises a third driving point;

a line segment connecting said second and said third driving points not being parallel to said first direction.

* * * * *